United States Patent
Kang et al.

(10) Patent No.: US 10,045,266 B2
(45) Date of Patent: Aug. 7, 2018

(54) SCHEME FOR TRANSMITTING AND RECEIVING INFORMATION IN WIRELESS COMMUNICATION SYSTEM

(71) Applicant: Samsung Electronics Co., Ltd., Suwon-si, Gyeonggi-do (KR)

(72) Inventors: Hyun-Jeong Kang, Seoul (KR); Sun-Heui Ryoo, Yongin-si (KR); Jung-Soo Jung, Seongnam-si (KR); Jong-Hyung Kwun, Seoul (KR); Suk-Won Kim, Yongin-si (KR); Bong-Jhin Shin, Yongin-si (KR); Sung-Jin Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/910,104

(22) PCT Filed: Aug. 8, 2014

(86) PCT No.: PCT/KR2014/007366
§ 371 (c)(1),
(2) Date: Feb. 4, 2016

(87) PCT Pub. No.: WO2015/020475
PCT Pub. Date: Feb. 12, 2015

(65) Prior Publication Data
US 2016/0183135 A1 Jun. 23, 2016

(30) Foreign Application Priority Data
Aug. 8, 2013 (KR) .................. 10-2013-0094343

(51) Int. Cl.
*H04W 36/00* (2009.01)
*H04W 36/04* (2009.01)
*H04W 76/15* (2018.01)

(52) U.S. Cl.
CPC .......... *H04W 36/04* (2013.01); *H04W 76/15* (2018.02); *H04W 36/0055* (2013.01); *H04W 36/0083* (2013.01); *H04W 36/0088* (2013.01)

(58) Field of Classification Search
CPC ........ H04W 76/025; H04W 28/08; H04L 5/00
See application file for complete search history.

(56) References Cited

U.S. PATENT DOCUMENTS

2008/0244148 A1* 10/2008 Nix, Jr. .............. H04L 41/0856
710/313
2011/0092234 A1 4/2011 Kim et al.
(Continued)

FOREIGN PATENT DOCUMENTS

CN 101572919 A 11/2009
CN 101772099 A 7/2010
(Continued)

OTHER PUBLICATIONS

LG Electronics, RAN1 related issues for support of dual connectivity between macro cell and small cell, R1-131300, 3GPP TSG RAN WG1 #72bis, Apr. 15-19, 2013, pp. 1-5, Chicago, USA.

*Primary Examiner* — Idowu O Osifade
(74) *Attorney, Agent, or Firm* — Jefferson IP Law, LLP

(57) ABSTRACT

The present disclosure relates to a pre-5th-generation (5G) or 5G communication system to be provided for supporting higher data rates beyond 4th-generation (4G) communication system such as a long term evolution (LTE). An operating method of a user equipment (UE) in a mobile communication system is provided. The operating method includes receiving a service through a first enhanced node B (eNB) for a first time interval period from a first timing point; and receiving the service through a second eNB for a
(Continued)

second time interval period from a second timing point, wherein the first timing point is different from the second timing point.

20 Claims, 25 Drawing Sheets

(56) References Cited

U.S. PATENT DOCUMENTS

| | | |
|---|---|---|
| 2012/0015655 A1 | 1/2012 | Lee |
| 2012/0244830 A1 | 9/2012 | Bao et al. |
| 2012/0257602 A1 | 10/2012 | Takahashi et al. |
| 2013/0095839 A1 | 4/2013 | Venkatraman et al. |
| 2014/0342738 A1* | 11/2014 | Ishii .................. H04W 28/08 |
| | | 455/436 |
| 2016/0219475 A1* | 7/2016 | Kim .................. H04W 28/08 |

FOREIGN PATENT DOCUMENTS

| | | |
|---|---|---|
| KR | 10-2012-0066069 A | 6/2012 |
| WO | 2013/040028 A2 | 3/2013 |
| WO | 2013/093174 A1 | 6/2013 |

* cited by examiner

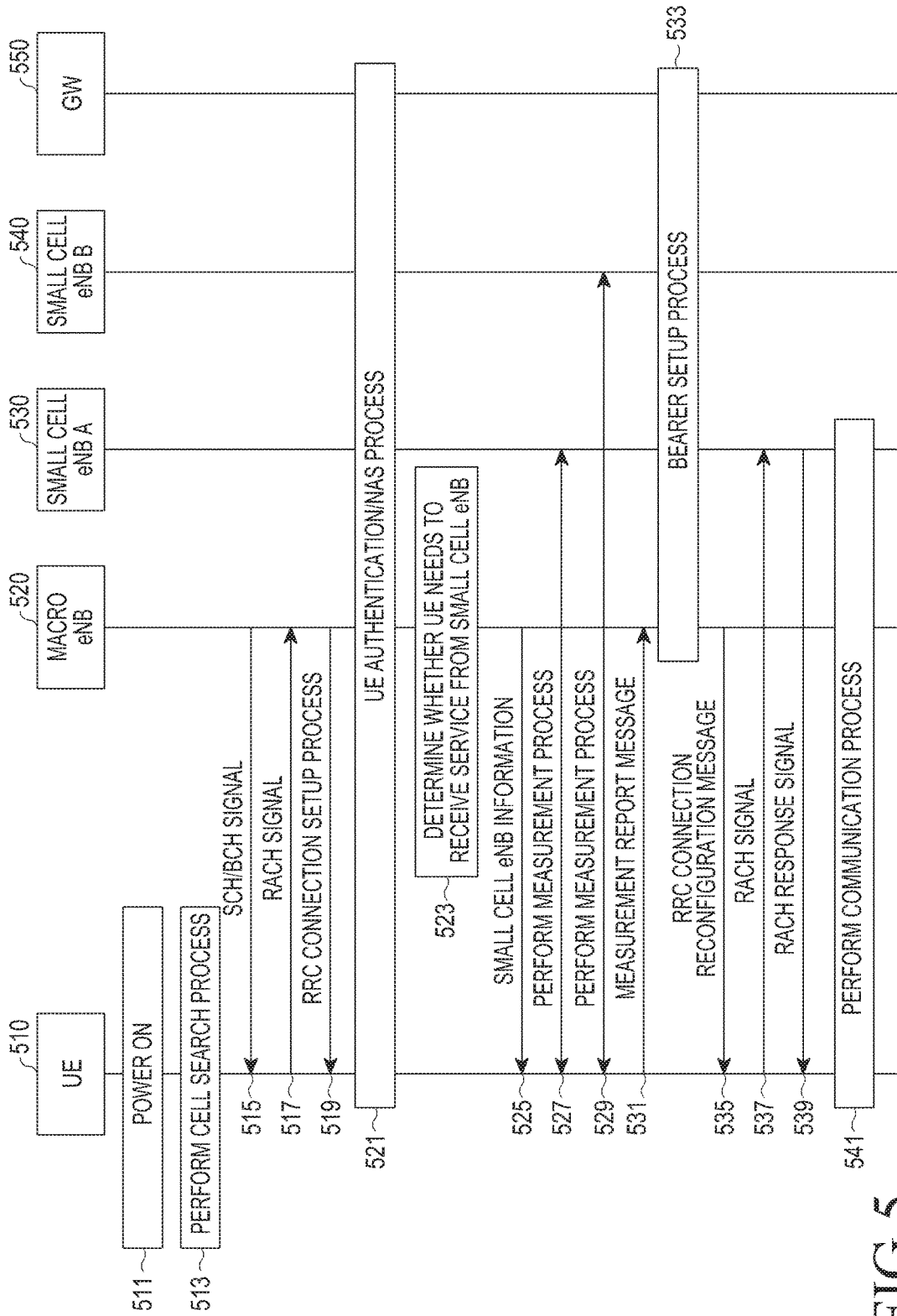

SCHEME FOR TRANSMITTING AND RECEIVING INFORMATION IN WIRELESS COMMUNICATION SYSTEM

CROSS-REFERENCE TO RELATED APPLICATION(S)

This application is a U.S. National Stage application under 35 U.S.C. § 371 of an International application filed on Aug. 8, 2014 and assigned application number PCT/KR2014/007366, which claimed the benefit of a Korean patent application filed on Aug. 8, 2013 in the Korean Intellectual Property Office and assigned Serial number 10-2013-0094343, the entire disclosure of which is hereby incorporated by reference.

TECHNICAL FIELD

The present disclosure relates to an apparatus and method for performing a switching operation between a macro cell and a small cell in a mobile communication system. More particularly, the present disclosure relates to an apparatus and method for performing a switching operation between a macro cell and a small cell in a mobile communication system where a macro cell and a small cell are co-located.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

Mobile communication systems have rapidly evolved, and recently have evolved to reflect user's various demands to support high-speed large-capacity services. Service providers are deploying small cells as well as macro cells in order to support high-speed large-capacity services for a user. The small cell is deployed to use a frequency which is higher than a frequency of the macro cell thereby supporting a data transmit rate which is higher than a data transmit rate of the macro cell. If it is difficult for the macro cell to support a new service which is provided in the mobile communication system, the mobile communication system may support the new service using the small cell which supports the relatively high data transmit rate.

Generally, even though a macro cell is deployed with a small cell in the mobile communication system, a user equipment (UE) may receive a service through only one of the macro cell and the small cell. However, in an evolved mobile communication system, the UE may receive a service through the both the macro cell and the small cell using a dual connectivity scheme.

A structure of a mobile communication system where a macro cell and a small cell are co-located is described below with reference to FIG. 1.

FIG. 1 schematically illustrates a structure of a mobile communication system where a macro cell and a small cell are co-located according to the related art.

Referring to FIG. 1, the mobile communication system includes a mobility management entity (MME) 111, a serving-gateway (S-GW) 113, a packet-gateway (P-GW) 115, a macro enhanced node B (eNB) 117, a plurality of small cell eNBs (e.g., eight small cell eNBs) 119-1, 119-2, 119-3, 119-4, 121-1, 121-2, 121-3, and 121-4, and a UE 123. The small cell eNBs 119-1, 119-2, 119-3, and 119-4 are included in a small cell cluster 119.

The UE 123 is connected to each of the macro eNB 117 and the small cell eNB 121-2, the macro eNB 117 is connected to each of the MME 111 and the S-GW 113, and the small cell eNB 121-2 is connected to the S-GW 113. Alternatively, the small cell eNB 121-2 may not be connected to the S-GW 113; in this case, the small cell eNB 121-2 is connected to the macro eNB 117. The UE 123 may be connected to the macro eNB 117, the small cell eNB 121-2, or the macro eNB 117 and the small cell eNB 121-2. The UE 123 may have a dual connection with the macro eNB 117 and the small cell eNB 121-2.

As described above, the UE 123 establishes a connection with each of the macro eNB 117 and the small cell eNB 121-2 at the same time (i.e., the UE 123 establishes a dual connection) thereby transmitting/receiving data with the macro eNB 117 and the small cell eNB 121-2. However, if the UE 123 is a hardware device which has a difficulty in establishing a connection with each of the macro eNB 117 and the small cell eNB 121-2 at the same time, or there is a difference between a transmit power which is used in the macro eNB 117 and a transmit power which is used in the small cell eNB 121-2, the UE 123 may be restricted on receiving a service through a dual connection from the macro eNB 117 and the small cell eNB 121-2.

In the mobile communication system, in a case that the macro eNB 117 is deployed to use a relatively low frequency band, and the small cell eNB 121-1 is deployed to use a relatively high frequency band which is not adjacent to a frequency band of the macro eNB 117, an implementation form of the UE 123 that the UE 123 establishes a connection with the macro eNB 117 and the small cell eNB 121-1 at the same time to transmit/receive data to/from the macro eNB 117 and the small cell eNB 121-1 is easier than an implementation form of the UE 123 that only the small cell eNB 121-1 supports relatively high data transmit rate for the UE 123 in terms of implementation.

Accordingly, in a mobile communication system, a UE may be connected to both a macro eNB and a small cell eNB to receive a service from both the macro eNB and the small cell eNB by separating a timing point at which the UE is connected to a macro eNB and a timing point at which the UE is connected to a small cell eNB (i.e., by using a time division multiplexing (TDM) dual connectivity scheme). There is a need for a scheme that a UE effectively performs a switching operation between a macro eNB and a small cell eNB. There is a need for a scheme of performing a switching operation in order to effectively provide a service to a UE in a case that the UE is connected to different types of cells using a dual connectivity scheme.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for performing a switching operation between a macro cell and a small cell in a mobile communication system.

Another aspect of the present disclosure is to provide an apparatus and method for performing a switching operation between a macro cell and a small cell in a mobile communication system where the macro cell and the small cell are co-located.

Another aspect of the present disclosure is to provide an apparatus and method for performing a switching operation between a macro cell and a small cell thereby effectively providing a service in a mobile communication system where the macro cell and the small cell are co-located.

Another aspect of the present disclosure is to provide an apparatus and method for performing a switching operation between a macro cell and a small cell thereby distributing load of the macro cell to the small cell in a mobile communication system where the macro cell and the small cell are co-located.

Another aspect of the present disclosure is to provide an apparatus and method for performing a switching operation between a macro cell and a small cell thereby providing a large-capacity service in a mobile communication system where the macro cell and the small cell are co-located.

Another aspect of the present disclosure is to provide an apparatus and method for performing a switching operation between a macro cell and a small cell thereby increasing system capacity of the entire mobile communication system in a mobile communication system where the macro cell and the small cell are co-located.

In accordance with an aspect of the present disclosure, a user equipment (UE) in a mobile communication system is provided. The UE includes a processor configured to perform an operation of receiving a service through a macro enhanced node B (eNB) for a first time interval period from a first timing point, and an operation of receiving the service through a small cell eNB for a second time interval period from a second timing point, wherein the first timing point is different from the second timing point.

In accordance with another aspect of the present disclosure, a first eNB in a mobile communication system is provided. The first eNB includes a processor configured to perform an operation of providing a service to a UE for a first time interval period from a first timing point, wherein the first timing point is different from a second timing point from which a second eNB provides the service to the UE for a second time interval.

In accordance with another aspect of the present disclosure, a second eNB in a mobile communication system is provided. The second eNB includes a processor configured to perform an operation of providing a service to a UE for a second time interval period from a second timing point, wherein the second timing point is different from a first timing point from which a first eNB provides the service to the UE for a first time interval.

In accordance with another aspect of the present disclosure, an operating method of a UE in a mobile communication system is provided. The operating method includes receiving a service through a first eNB for a first time interval period from a first timing point, and receiving the service through a second eNB for a second time interval period from a second timing point, wherein the first timing point is different from the second timing point.

In accordance with another aspect of the present disclosure, an operating method of a first eNB in a mobile communication system is provided. The operating method includes providing a service to a UE for a first time interval period from a first timing point, wherein the first timing point is different from a second timing point from which a second eNB provides the service to the UE for a second time interval.

In accordance with another aspect of the present disclosure, an operating method of a second eNB in mobile a communication system is provided. The operating method includes providing a service to a UE for a second time interval period from a second timing point, wherein the second timing point is different from a first timing point from which a first eNB provides the service to the UE for a first time interval.

As is apparent from the foregoing description, embodiments of the present disclosure enables effectively performing a switching operation between a macro cell and a small cell thereby effectively providing a service in a mobile communication system where the macro cell and the small cell are co-located.

Another embodiment of the present disclosure enables effectively performing a switching operation between a macro cell and a small cell thereby distributing load of the macro cell to the small cell in a mobile communication system where the macro cell and the small cell are co-located.

Another embodiment of the present disclosure enables effectively performing a switching operation between a macro cell and a small cell thereby providing a large-capacity service in a mobile communication system where the macro cell and the small cell are co-located.

Another embodiment of the present disclosure enables effectively performing a switching operation between a macro cell and a small cell thereby increasing system capacity of the entire mobile communication system in a mobile communication system where the macro cell and the small cell are co-located.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 schematically illustrates a process of performing a switching operation between a macro enhanced node B (eNB) and a small cell eNB in a UE in a mobile communication system according to an embodiment of the present disclosure;

Throughout the drawings, it should be noted that like reference numbers are used to depict the same or similar elements, features, and structures.

DETAILED DESCRIPTION

Figure 1:
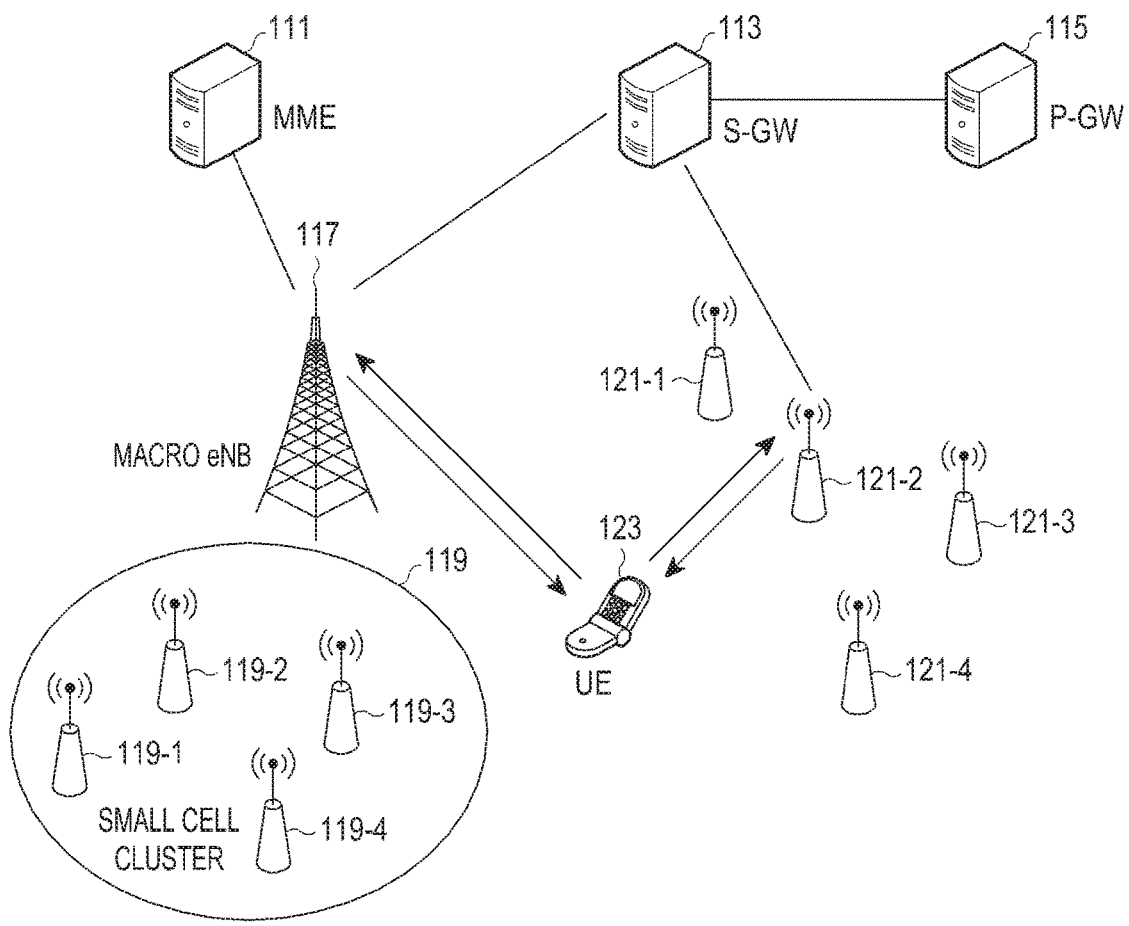
FIG. 1 schematically illustrates a structure of a mobile communication system where a macro cell and a small cell are co-located according to the related art.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the present disclosure. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

An embodiment of the present disclosure proposes an apparatus and method for performing a switching operation between a macro cell and a small cell in a mobile communication system.

An embodiment of the present disclosure proposes an apparatus and method for performing a switching operation between a macro cell and a small cell in a mobile communication system where the macro cell and the small cell are co-located.

An embodiment of the present disclosure proposes an apparatus and method for performing a switching operation between a macro cell and a small cell thereby effectively providing a service in a mobile communication system where the macro cell and the small cell are co-located.

An embodiment of the present disclosure proposes an apparatus and method for performing a switching operation between a macro cell and a small cell thereby distributing load of the macro cell to the small cell in a mobile communication system where the macro cell and the small cell are co-located.

An embodiment of the present disclosure proposes an apparatus and method for performing a switching operation between a macro cell and a small cell thereby providing a large-capacity service in a mobile communication system where the macro cell and the small cell are co-located.

An embodiment of the present disclosure proposes an apparatus and method for performing a switching operation between a macro cell and a small cell thereby increasing system capacity of the entire mobile communication system in a mobile communication system where the macro cell and the small cell are co-located.

A method and apparatus proposed in various embodiments of the present disclosure may be applied to various communication systems such as a long term evolution (LTE) system, an LTE-advanced (LTE-A) system, a high speed downlink packet access (HSDPA) mobile communication system, a high speed uplink packet access (HSUPA) mobile communication system, a high rate packet data (HRPD) mobile communication system proposed in a 3rd generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) mobile communication system, an evolved packet system (EPS), a mobile internet protocol (Mobile IP) system, and/or the like.

It will be assumed that a mobile communication system which is described in an embodiment of the present disclosure is a mobile communication system in which a macro cell and a small cell are co-located.

A process of supporting a switching operation between a macro cell and a small cell in a case that a user equipment (UE) is located at a region in which a macro cell coverage overlaps with a small cell coverage in a mobile communication system according to an embodiment of the present disclosure is described below with reference to FIGS. 2A to 2C.

A process of supporting a switching operation between a macro cell and a small cell in a case that a UE is located at a region in which a macro cell coverage overlaps with a small cell coverage in a mobile communication system according to an embodiment of the present disclosure is described below with reference to FIG. 2A.

Figure 2A:
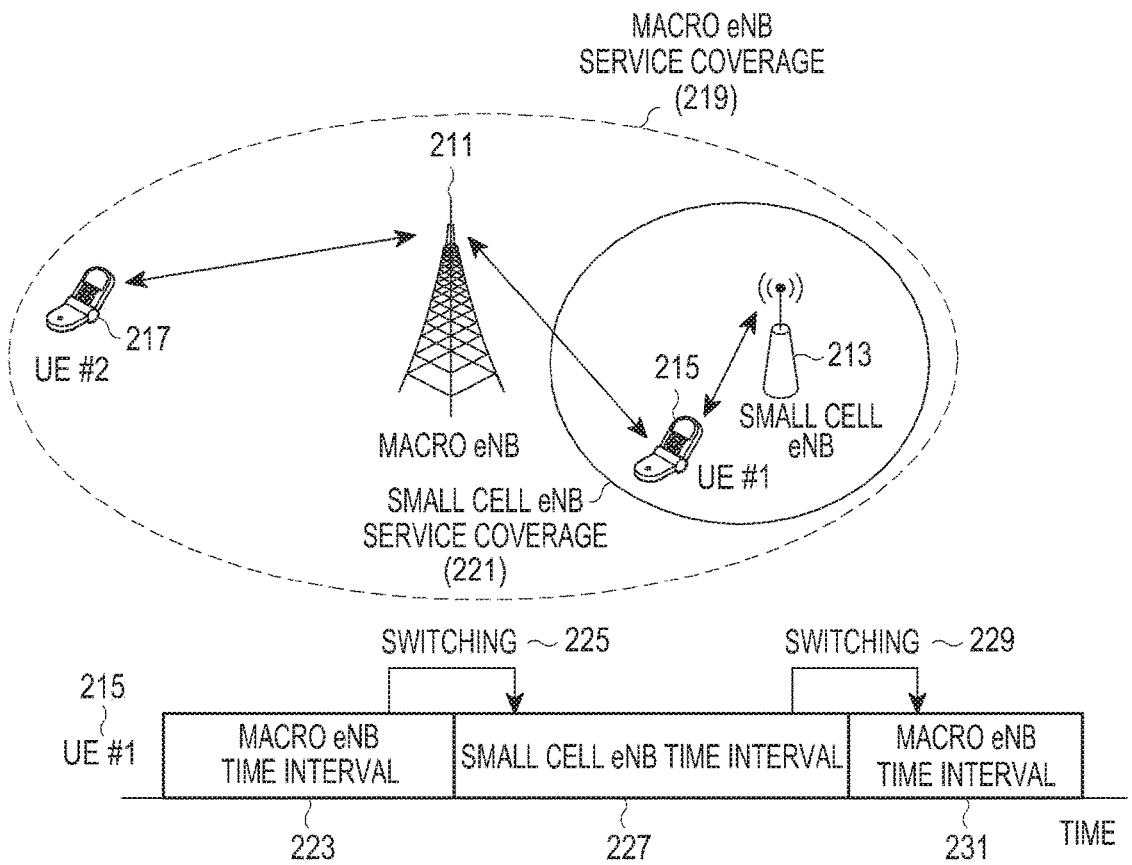
FIG. 2A schematically illustrates a process of supporting a switching operation between a macro cell and a small cell in a case that a user equipment (UE) is located at a region in which a macro cell coverage overlaps with a small cell coverage in a mobile communication system according to an embodiment of the present disclosure.

FIG. 2A schematically illustrates a process of supporting a switching operation between a macro cell and a small cell in a case that a UE is located at a region in which a macro cell coverage overlaps with a small cell coverage in a mobile communication system according to an embodiment of the present disclosure.

Referring to FIG. 2A, the mobile communication system includes a macro enhanced node B (eNB) 211, a small cell eNB 213, a UE #1 215, and a UE #2 217. The UE #1 215 is located at a region where a service coverage 219 of the macro eNB 211 overlaps with a service coverage 221 of the small eNB 213, and the UE #2 217 is located within the service coverage 219 of the macro eNB 211.

The UE #1 215 receives a service through the macro eNB 211 at an arbitrary time interval t (223). If the time interval t expires, the UE #1 215 performs a switching operation from the macro eNB 211 to the small cell eNB 213 (225) to receive the service through the small cell eNB 213 at a time interval t+1 as a time interval after the time interval t 227. If the time interval t+1 expires, the UE #1 215 performs a switching operation from the small cell eNB 213 to the macro eNB 211 (229) to receive the service through the macro eNB 211 at a time interval t+2 as a time interval after the time interval t+1 (231).

An example of a frame deployment for supporting a switching operation between a macro cell and a small cell in a case that a UE is located at a region in which a macro cell coverage overlaps with a small cell coverage in a mobile communication system according to an embodiment of the present disclosure is described below with reference to FIG. 2B.

Figure 2B:
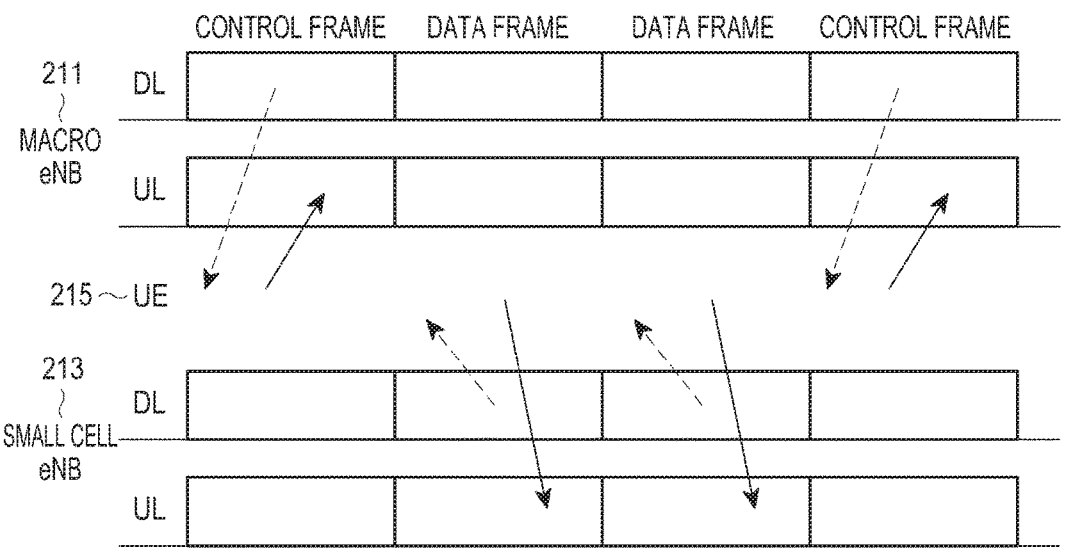
FIG. 2B schematically illustrates an example of a frame deployment for supporting a switching operation between a macro cell and a small cell in a case that a UE is located at a region in which a macro cell coverage overlaps with a small cell coverage in a mobile communication system according to an embodiment of the present disclosure.

FIG. 2B schematically illustrates an example of a frame deployment for supporting a switching operation between a macro cell and a small cell in a case that a UE is located at a region in which a macro cell coverage overlaps with a small cell coverage in a mobile communication system according to an embodiment of the present disclosure.

Referring to FIG. 2B, a macro eNB 211 transmits/receives a control signal to/from a UE 215, and a small cell eNB 213 transmits/receives a data packet to/from the UE 215. A control frame and a data frame for the UE 215 are previously determined at a timing point that the UE 215 establishes a dual connection with the macro eNB 211 and the small cell eNB 213.

For example, the control frame is used for the UE 215 to transmit/receive a control signal which is necessary for performing a channel measurement report operation or a radio resource control (RRC) operation to/from the macro eNB 211. The data frame is used for the UE 215 to transmit/receive a data packet to/from the small eNB 213. In this case, the macro eNB 211 does not need to maintain a resource which is used for processing the data packet, e.g., bearer connection information.

Another example of a frame deployment for supporting a switching operation between a macro cell and a small cell in a case that a UE is located at a region in which a macro cell coverage overlaps with a small cell coverage in a mobile communication system according to an embodiment of the present disclosure is described below with reference to FIG. 2C.

Figure 2C:
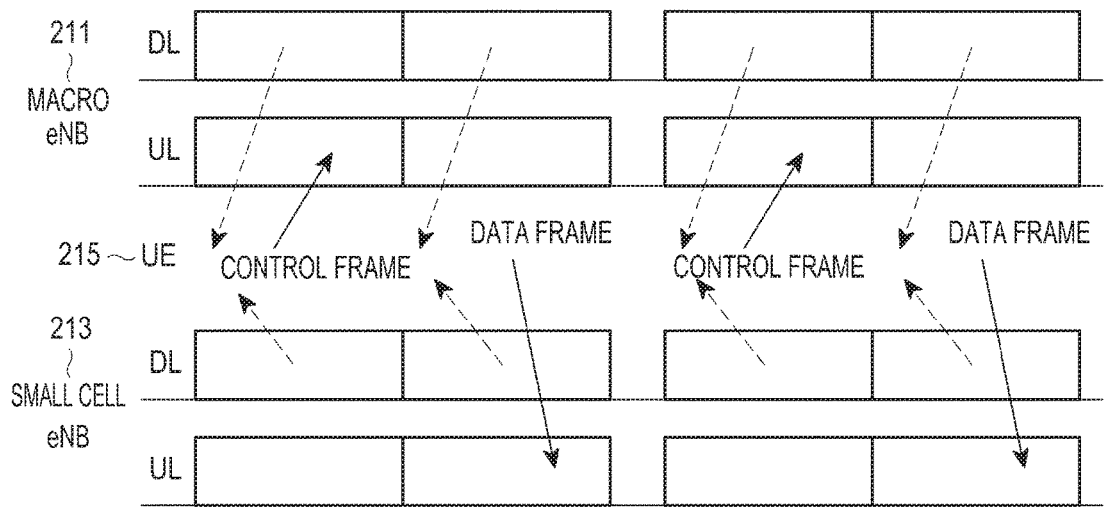
FIG. 2C schematically illustrates an example of a frame deployment for supporting a switching operation between a macro cell and a small cell in a case that a UE is located at a region in which a macro cell coverage overlaps with a small cell coverage in a mobile communication system according to an embodiment of the present disclosure.

FIG. 2C schematically illustrates another example of a frame deployment for supporting a switching operation between a macro cell and a small cell in a case that a UE is located at a region in which a macro cell coverage overlaps with a small cell coverage in a mobile communication system according to an embodiment of the present disclosure.

Referring to FIG. 2C, a macro eNB 211 transmits/receives a control signal to/from the UE 215, and transmits a downlink data packet to the UE 215. The small cell eNB 213 receives an uplink data packet from the UE 215, and transmits a downlink data packet to the UE 215.

The UE 215 may simultaneously receive downlink data packets from both the macro eNB 211 and the small cell eNB 213, or may receive a downlink data packet from one of the macro eNB 211 and the small cell eNB 213. The UE 215 may transmit an uplink data packet to only the small cell eNB 213.

The UE 215 should be connected to the small cell eNB 213 at a timing point that the UE 215 wants to transmit an uplink data packet in order to transmit the uplink data packet. If the UE 215 is connected to the macro eNB 211 when the UE 215 wants to transmit the uplink data packet, the UE 215 should perform a switching operation from the macro eNB 211 to the small cell eNB 213. In this case, the macro eNB 211 does not need to maintain a resource for the uplink data packet, e.g., bearer connection information.

In another example, a UE is set to receive different types of services from a macro eNB and a small cell eNB. In this example, the macro eNB provides the first type of service to the UE, and the small cell eNB provides the second type of service to the UE. The UE performs a switching operation between the macro eNB and the small cell eNB according to a timing point that the macro eNB provides the first type of service and a timing point that the small cell eNB provides the second type of service.

Another example of a frame deployment for supporting a switching operation between a macro cell and a small cell in a case that a UE is located at a region in which a macro cell coverage overlaps with a small cell coverage in a mobile communication system according to an embodiment of the present disclosure is described below with reference to FIG. 3A.

Figure 3A:
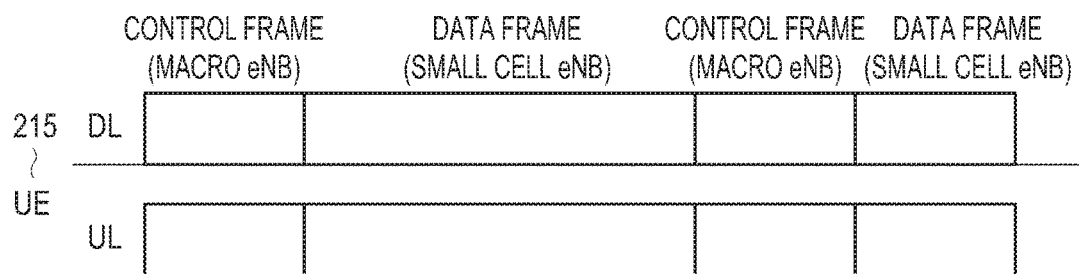
FIG. 3A schematically illustrates an example of a frame deployment for supporting a switching operation between a macro cell and a small cell in a case that a UE is located at a region in which a macro cell coverage overlaps with a small cell coverage in a mobile communication system according to an embodiment of the present disclosure.

FIG. 3A schematically illustrates another example of a frame deployment for supporting a switching operation between a macro cell and a small cell in a case that a UE is located at a region in which a macro cell coverage overlaps with a small cell coverage in a mobile communication system according to an embodiment of the present disclosure.

Referring to FIG. 3A, a time interval that a control frame which a macro eNB provides occupies, i.e., a control frame time interval is identical to a control frame time interval that a small cell eNB provides, and a time interval that a data frame which a macro eNB provides occupies, i.e., a data frame time interval is identical to a data frame time interval that a small cell eNB provides. That is, the frame deployment in FIG. 3A indicates a frame deployment in a case that it is assumed that the macro eNB and the small cell eNB operate the control frame time interval and the data frame time interval with the same form.

Another example of a frame deployment for supporting a switching operation between a macro cell and a small cell in a case that a UE is located at a region in which a macro cell coverage overlaps with a small cell coverage in a mobile communication system according to an embodiment of the present disclosure is described below with reference to FIG. 3B.

Figure 3B:
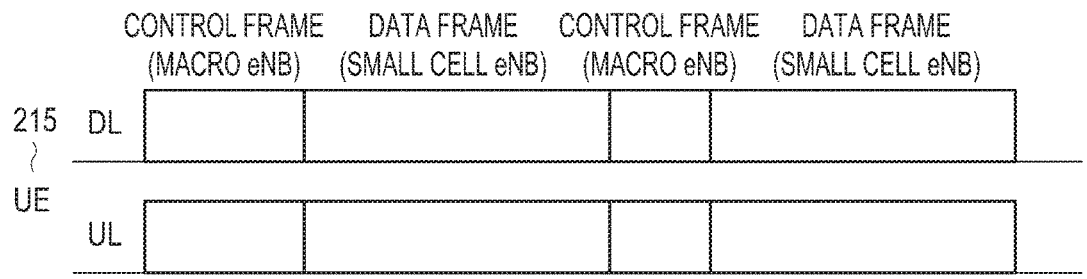
FIG. 3B schematically illustrates an example of a frame deployment for supporting a switching operation between a macro cell and a small cell in a case that a UE is located at a region in which a macro cell coverage overlaps with a small cell coverage in a mobile communication system according to an embodiment of the present disclosure.

FIG. 3B schematically illustrates another example of a frame deployment for supporting a switching operation between a macro cell and a small cell in a case that a UE is located at a region in which a macro cell coverage overlaps with a small cell coverage in a mobile communication system according to an embodiment of the present disclosure.

Referring to FIG. 3B, a control frame time interval which a macro eNB provides is different from a control frame time interval which a small cell eNB provides, and a data frame time interval which the macro eNB provides is different from a data frame time interval which the small cell eNB provides. The frame deployment in FIG. 3B indicates a frame deployment in a case that it is assumed that the macro eNB and the small cell eNB operate the control frame time interval and the data frame time interval with the different forms.

A frame configuration which is used in the macro eNB and a frame configuration which is used in the small cell eNB may be related to information related to time during a UE receives a service from the macro eNB and time during the UE receives a service from the small cell eNB, i.e., UE frame configuration information. The UE frame configuration information denotes time during the UE receives the service from the macro eNB and time during the UE receives the service from the small cell eNB.

For example, the UE frame configuration information may be transmitted to the UE if the UE attaches to a network. In this case, the UE frame configuration information may be transmitted to the UE using a RRC message. Alternatively, the UE frame configuration information may be transmitted to the UE using a message which sets a service bearer for the UE.

If the UE frame configuration information needs to be changed after the UE frame configuration information is transmitted to the UE, the changed UE frame configuration information is transmitted to the UE through a message which re-configures a service bearer for the UE, or the changed UE frame configuration information is transmitted to the UE through a RRC message as a new form. Accordingly, the UE frame configuration information which is received in the UE is valid until the UE receives the next UE frame configuration information.

For example, the UE frame configuration information may be determined based on a time during which the UE receives a service from a macro eNB, or a service type of a service which the UE will receive.

The UE frame configuration information may be transmitted to the UE if the UE attaches to a network. In this case, the UE frame configuration information may be transmitted to the UE using a RRC message. Alternatively, the UE frame configuration information may be transmitted to the UE using a message which sets a service bearer for the UE.

If the UE frame configuration information needs to be changed after the UE frame configuration information is transmitted to the UE, the changed UE frame configuration information is transmitted to the UE through a message which re-configures a service bearer for the UE, or the changed UE frame configuration information is transmitted to the UE through a RRC message as a new form. Accordingly, the UE frame configuration information which is received in the UE is valid until the UE receives the next UE frame configuration information.

For example, the UE frame configuration information may be determined based on a time during which the UE receives a service from a macro eNB, or a service type of a service which the UE will receive, and a detailed description will be followed.

If the UE frame configuration is determined based on the time during which the UE receives the service from the macro eNB, the service which the UE receives from the macro eNB includes, for example, a UE operating control signal transmitting/receiving process, a channel measurement report signal transmitting/receiving process, and a service which is limited to a macro eNB, e.g., a voice over internet protocol (VoIP) service. For example, the time during which the UE receives the service from the macro eNB may correspond to time which is necessary for the UE to report a report measurement to the macro eNB. If the macro eNB provides a default service, e.g., a VoIP service or a best effort service, the time during which the UE receives the service from the macro eNB may correspond to time during which the UE receives the default service from the macro eNB and time which is necessary for the UE to report a measurement result to the macro eNB. The time during which the UE receives the service from the macro eNB may correspond to time during which the UE reports the measurement result to the macro eNB and time during the UE transmits/receives a RRC signal to/from the macro eNB.

If the UE frame configuration is determined based on the type of the service which the UE will receive, time which is necessary for receiving a default service from the macro eNB may correspond to a time frame of the macro eNB and time which is necessary for receiving a multimedia service from the small cell eNB may correspond to a time frame of the small cell eNB when the UE receives the default service from the macro eNB and the multimedia service from the small cell eNB.

The UE frame configuration information may be changed while the UE receives the service from at least one of the macro eNB and the small cell eNB. In this case, the UE frame configuration information may be determined based on the time required for a service which is activated for the UE. If a service which the UE receives at an initial setting process through the small cell eNB is the VoIP service, the time required for the UE to receive the VoIP service may correspond to time during which the UE receives a service from the small cell eNB, and remaining time may correspond to time during which the UE receives a service from the macro eNB.

If the UE additionally receives a video streaming service from the small cell eNB while receiving the VoIP service from the small cell eNB, the time required for receiving the VoIP service and the video streaming service may correspond to time during which the UE receives the service from the small cell eNB, and remaining time to time during which the UE receives the service from the macro eNB.

On the other hand, the time during which the UE receives the service from the macro eNB and the time during which the UE receives the service from the small cell eNB may be determined using the number of automatic retransmission request (ARQ) blocks which the UE will receive/transmit in each of the macro eNB and the small cell eNB. Each of the macro eNB and the small cell eNB determines the number of ARQ blocks which each of the macro eNB and the small cell eNB will transmit/receive with the UE in advance, the UE processes ARQ blocks of which the number is determined in the macro eNB and switches to the small cell eNB to process ARQ blocks of which the number is determined in the small cell eNB thereby maintaining a dual connection with the macro eNB and the small cell eNB.

Even though the time during which the UE receives the service from the macro eNB and the time during which the UE receives the service from the small cell eNB are determined based on UE frame configuration information, the UE may not operate using the UE frame configuration information if a specific event occurs. This is described below with reference to FIGS. 4A and 4B.

Figure 4A:
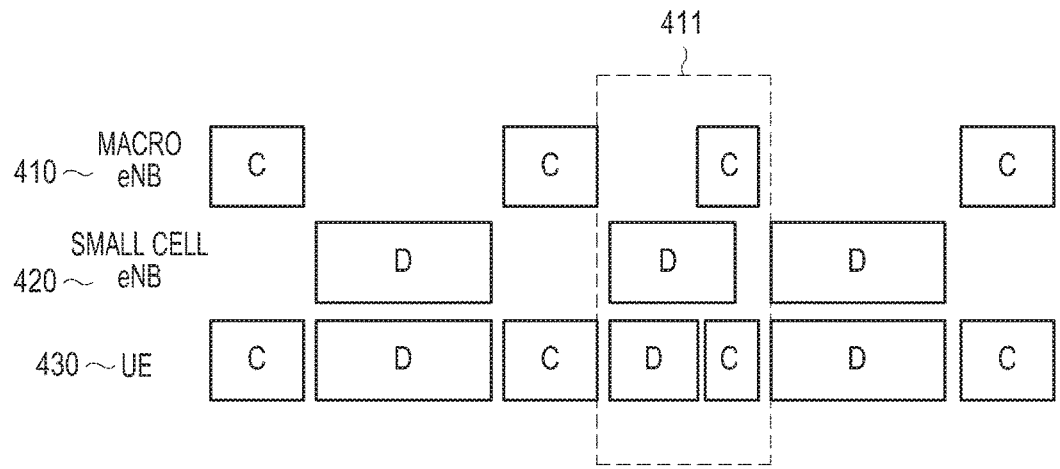
FIG. 4A schematically illustrates an example of operating a UE frame according to event occurrence in a mobile communication system according to an embodiment of the present disclosure.

FIG. 4A schematically illustrates an example of operating a UE frame according to event occurrence in a mobile communication system according to an embodiment of the present disclosure.

Referring to FIG. 4A, a region 'C' denotes a control frame, and a region 'D' denotes a data frame. A UE 430 should receive a user data signal from a small cell eNB 420 in a time interval 411 which is indicated with a dotted line. In the time interval 411, an event that the UE 430 should transmit an event based channel measurement report message or a RRC message to the macro eNB 410 may occur. In this case, even though the time during which the UE 430 receives a service from the small cell eNB 420 does not end, the UE 430 may switch from the small cell eNB 420 to the macro eNB 410 to perform an event related operation, i.e., a transmitting/receiving operation for an event related message.

After completing the event related operation with the macro eNB 410, the UE 430 receives the service from the macro eNB 410 if a related timing point is in a time interval during which the UE 430 receives the service from the macro eNB 410 corresponding to the UE frame configuration information. If the related timing point is a timing point at which the UE 430 receives the service from the small cell eNB 420 corresponding to the UE frame configuration information, the UE 430 switches from the macro eNB 410 to the small cell eNB 420 to receive the service from the small cell eNB 420.

Another example of operating a UE frame according to event occurrence in a mobile communication system according to an embodiment of the present disclosure is described below with reference to FIG. 4B.

Figure 4B:
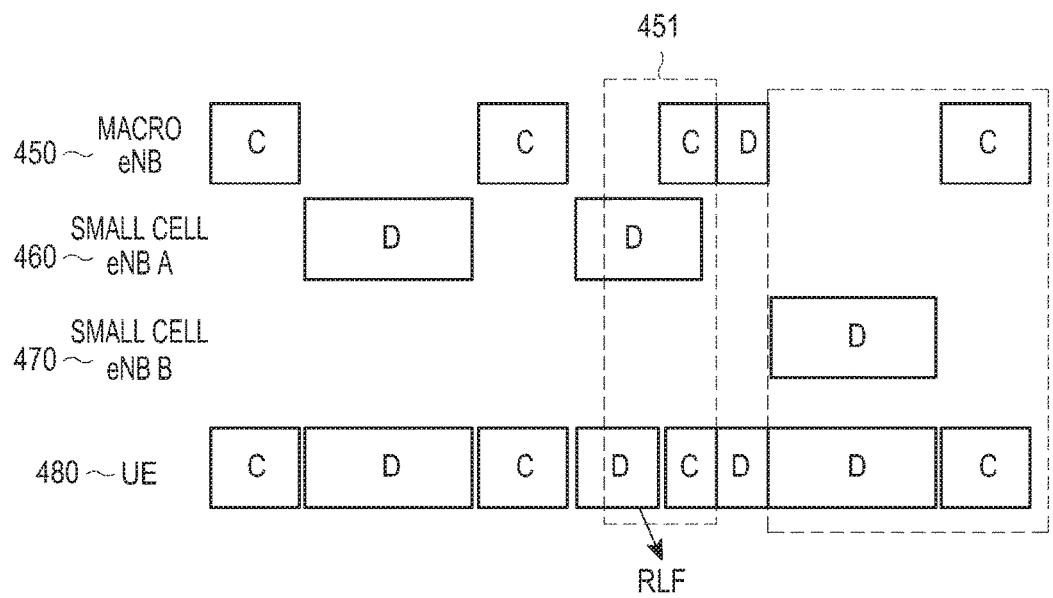
FIG. 4B schematically illustrates an example of operating a UE frame according to event occurrence in a mobile communication system according to an embodiment of the present disclosure.

FIG. 4B schematically illustrates another example of operating a UE frame according to event occurrence in a mobile communication system according to an embodiment of the present disclosure.

Referring to FIG. 4B, a radio link failure (RLF) event where a UE 480 no longer receives service from a small cell eNB A 460 in a time interval during which the UE 480 receives the service from the small cell eNB A 460 according to UE frame configuration information may occur at time 451. In this case, the UE 480 switches from the small cell eNB A 460 to a macro eNB 450 to report that the RLF occurs in the small cell eNB A 460 to the macro eNB 450.

Since the small cell eNB A 460 is no longer providing service UE 480, the macro eNB 450 may determine a handover for the UE 480 in order for other small cell eNB or macro eNB to provide the service for the UE 480. If the macro eNB 450 selects other small cell eNB as an eNB which will provide the service for the UE 480, the macro eNB 450 may directly the service to the UE 480 in order to minimize service time delay for the UE 480 before resuming the service for the UE 480 with the other small cell eNB. If the macro eNB 450 completes preparation of providing the service to the UE 480 with the other small cell eNB while temporarily providing the service to the UE 480 before the other small cell eNB provides the service to the UE 480, the macro eNB 450 commands the UE 480 to switch to the other small cell eNB.

Accordingly, the UE 480 switches from the macro eNB 450 to the other small cell eNB (i.e., a small cell eNB B 470) to continuously receive the service which the UE 480 has received from the small cell eNB A 460 from the small cell eNB B 470. That is, the UE 480 maintains a dual connection with the macro eNB 450 and the small cell eNB B 470 corresponding to the UE frame configuration information.

A process of performing a switching operation between a macro eNB and a small cell eNB in a UE in a mobile communication system according to an embodiment of the present disclosure is described below with reference to FIG. 5.

FIG. 5 schematically illustrates a process of performing a switching operation between a macro eNB and a small cell eNB in a UE in a mobile communication system according to an embodiment of the present disclosure.

Referring to FIG. 5, the mobile communication system includes a UE 510, a macro eNB 520, a small cell eNB A 530, a small cell eNB B 540, and a GW 550.

After being powered on at operation 511, the UE 510 performs a cell search process at operation 513. The UE 510 receives a synchronization channel (SCH) signal and a broadcast channel (BCH) signal from the macro eNB 520 which is selected according to performing the sell search process at operation 515. The UE 510 transmits a random access channel (RACH) signal to the macro eNB 520 to perform an uplink access process with the macro eNB 520 at operation 517.

The UE 510 performs a RRC connection setup process with the macro eNB 520 at operation 519. In the RRC connection setup process, a RRC connection setup message is exchanged between the UE 510 and the macro eNB 520. The RRC connection setup message includes switching capability information on the UE 510, and the switching capability information includes information indicating whether a related UE supports a switching operation between a macro eNB and a small cell eNB. In the example shown in FIG. 5, the switching capability information indicates that the related UE (i.e., the UE 510) supports the switching operation between the macro eNB and the small cell eNB. The UE 510 performs an authentication process, an encryption process, and a network application support (NAS) connection setup process with the macro eNB 520 and the GW 550 at operation 521. The detailed description of the authentication process, the encryption process, and the NAS connection setup process will be omitted herein.

The UE 510 supports the switching operation between the macro eNB and the small cell eNB, so the macro eNB 520 determines whether the UE 510 needs to receive a service from a small cell eNB not the macro eNB 520 at operation 523. If the UE 510 needs to receive the service from the small cell eNB not the macro eNB 520, the macro eNB 520 provides small cell eNB information indicating information on small cell eNBs which are connected to the macro eNB 520 to the UE 510. The UE 510 performs a measurement process for the small cell eNBs at operation 525. The small cell eNB information includes information necessary for performing a measurement process for each of the small cell eNBs which are connected to the macro eNB 520, e.g., system information, a measurement metric, a measurement report metric, and the like. After receiving the small cell eNB information, the UE 510 performs a measurement process for small cell eNBs based on the small cell eNB information at operations 527 and 529. After performing the measurement process for the small cell eNBs, the UE 510 transmits a measurement report message including the measurement process performance result to the macro eNB 520 at operation 531.

After receiving the measurement report message from the UE 510, the macro eNB 520 determines a small cell eNB which will provide the service to the UE 510 based on the measurement process performance result included in the measurement report message. In FIG. 5, it will be assumed that the macro eNB 520 determines the small cell eNB which will provide the service to the UE 510 as the small cell eNB A 530, so the macro eNB 520 performs a bearer setup process with the small cell eNB A 530 and the GW 550 at operation 533.

The macro eNB 520 transmits a bearer parameter for a bearer through which the small cell eNB A 530 will provide the service to the UE 510 and path information on a path between the macro eNB 520 and the GW 550 for the bearer to the small cell eNB A 530. After receiving the bearer parameter and the path information from the macro eNB 520, the small cell eNB A 530 establishes a path with the GW 550 based on the path information. The GW 550 may or may not recognize existence of the small cell eNB A 530. If the GW 550 does not recognize the existence of the small cell eNB A 530, the small cell eNB A 530 intercepts a data packet which is transferred from the GW 550 to transfer the data packet to the UE 520 instead of the macro eNB 520, and transfers a data packet which is received from the UE 520 to the GW 550 instead of the macro eNB 520.

After setting up the bearer, the macro eNB 520 transmits a RRC connection reconfiguration message to the UE 510 at operation 535. The RRC connection reconfiguration message includes bearer parameters related to the set up bearer, small cell eNB identifier (ID), information on a dedicated RACH resource in a related small cell eNB, UE-frame configuration information, measurement configuration information, and the like. The information on the dedicated RACH resource indicates information on a dedicated RACH resource which is allocated for transmitting a switch indicator indicating that the UE 510 has switched to the small cell eNB A 530. The RRC connection reconfiguration message includes switch indication information indicating that the UE 510 should switch to the small cell eNB A 530.

After receiving the RRC connection reconfiguration message from the macro eNB 520, the UE 510 switches from the macro eNB 520 to the small cell eNB A 530, and transmits a switch indicator indicating that the UE 510 switches from the macro eNB 520 to the small cell eNB A 530 using a dedicated RACH resource corresponding to the information on the dedicated RACH resource which is transferred through the RRC connection reconfiguration message. After receiving the RRC connection reconfiguration message, the UE 510 transmits a RACH signal including a switch indicator to the small cell eNB A 530 at operation 537. After receiving the RACH signal including the switch indicator from the UE 510, the small cell eNB A 530 transmits a RACH response message to the UE 510 at operation 539. A communication process for a service indicated by the RRC connection reconfiguration message is performed between the UE 510 and the small cell eNB A 530 at operation 541.

Although FIG. 5 illustrates a process of performing a switching operation between a macro eNB and a small cell eNB in a UE in a mobile communication system according to an embodiment of the present disclosure, various changes could be made to FIG. 5. For example, although shown as a series of operations, various operations in FIG. 5 could overlap, occur in parallel, occur in a different order, or occur multiple times.

A process of setting up a data path which supports that a UE performs a switching operation between a macro eNB and a small cell eNB in a mobile communication system according to an embodiment of the present disclosure is described below with reference to FIGS. 6A and 6B.

An example of a process of setting up a data path which supports that a UE performs a switching operation between a macro eNB and a small cell eNB in a mobile communication system according to an embodiment of the present disclosure is described below with reference to FIG. 6A.

Figure 6A:
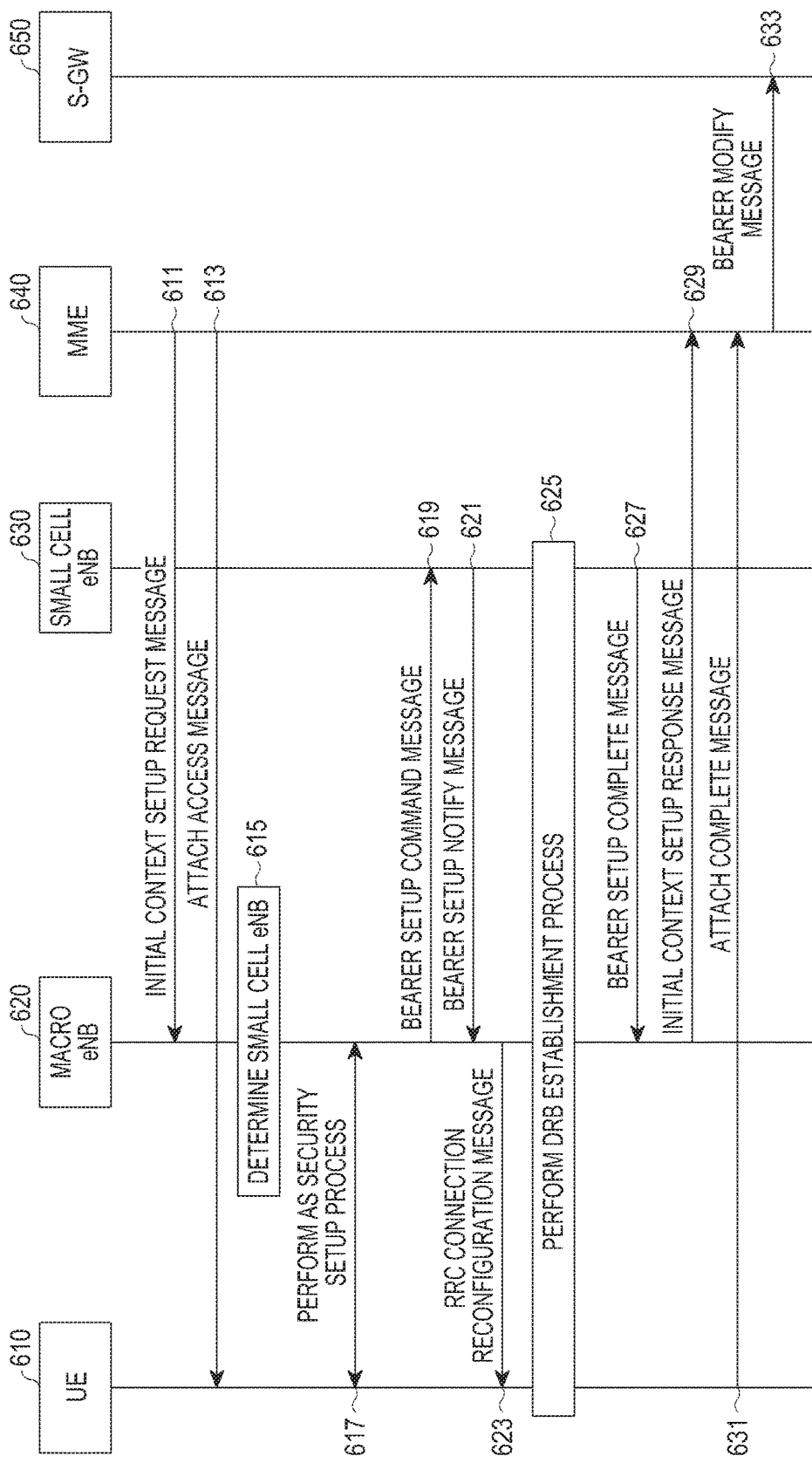
FIG. 6A schematically illustrates an example of a process of setting up a data path which supports that a UE performs a switching operation between a macro eNB and a small cell eNB in a mobile communication system according to an embodiment of the present disclosure.

FIG. 6A schematically illustrates an example of a process of setting up a data path which supports that a UE performs a switching operation between a macro eNB and a small cell eNB in a mobile communication system according to an embodiment of the present disclosure.

Referring to FIG. 6A, the mobile communication system includes a UE 610, a macro eNB 620, a small cell eNB 630, a mobility management entity (MME) 640, and a serving-gateway (S-GW) or packet-gateway (P-GW) 650.

The MME 640 transmits an initial context setup request message for the UE 610 to the macro eNB 620 which is connected to the UE 610 which performs a network entry process at operation 611. The MME 640 transmits an attach accept message to the UE 610 at operation 613. After receiving the initial context setup request message from the MME 640, the macro eNB 620 determines a small cell eNB from which the UE 610 will receive a service at operation 615.

After receiving the attach accept message from the MME 640, the UE 610 performs an access stratum (AS) security setup process with the macro eNB 620 at operation 617. After performing the AS security setup process with the UE 610, the macro eNB 620 transmits a bearer setup command message to the small cell eNB 630 at operation 619. The bearer setup command message is a message which commands to set up a data path, and includes a UE ID of a UE to which the small cell eNB 630 will provide a service, i.e., the UE 610, an S1 S-GW tunnel endpoint ID (TEID) as a UE data path ID of a UE data path between the S-GW 650 and the macro eNB 620, an S1 eNB TEID as a UE data path ID of a UE data path between the macro eNB 620 and the small cell eNB 630, an AS security key, and the like.

After receiving the bearer setup command message from the macro eNB 620, the small cell eNB 630 transmits a bearer setup notify message as a response message to the bearer setup command message to the macro eNB 620 at operation 621. After receiving the bearer setup notify message from the small cell eNB 630, the macro eNB 620 transmits a RRC connection reconfiguration message to the UE 610 at operation 623. The RRC connection reconfiguration message includes a small cell eNB ID of a small cell eNB from which the UE 610 will receive a service, i.e., the small cell eNB 630, a switching indication information which commands the UE 610 to switch to a small cell eNB corresponding to the small cell eNB ID, information on a service which the UE 610 will receive from the small cell eNB 630, bearer parameters, and information on a RACH resource which is used for the UE 610 to transmit a switch indicator indicating that the UE 610 switches to the small cell eNB 630 to the small cell eNB 630.

After receiving the RRC connection reconfiguration message from the macro eNB 620, the UE 610 switches to the small cell eNB 630 corresponding to the RRC connection reconfiguration message, and performs a data radio bearer (DRB) establish process with the small cell eNB 630 at operation 625. After the DRB establish process between the UE 610 and the small cell eNB 630 is completed, the small cell eNB 630 transmits a bearer setup complete message indicating that a bearer setup has been completed to the macro eNB 620 at operation 627. The bearer setup complete message includes a UE ID of the UE 610, an S1 eNB TEID, and the like.

After receiving the bearer setup complete message from the small cell eNB 630, the macro eNB 620 transmits an initial context setup response message as a response message to the initial context setup message to the MME 640 at operation 629. The initial context setup response message includes an eNB TEID, EPS bearer ID, and the like. The EPS bearer ID denotes a UE data path ID of a UE data path between the macro eNB 620 and the S-GW 650, i.e., an ID of an EPS bearer between the macro eNB 620 and the S-GW 650.

After completing the DRB establish process with the small cell eNB 630, the UE 610 transmits an attach complete message indicating that a network attach has been completed to the MME 640 at operation 631. The attach complete message includes an EPS bearer ID. After receiving the attach complete message from the UE 610, the MME 640 transmits a modify bearer message to the S-GW 650 at operation 633. The modify bearer message includes an S1 eNB TEID, and an EPS bearer ID.

Although FIG. 6A illustrates an example of a process of setting up a data path which supports that a UE performs a switching operation between a macro eNB and a small cell eNB in a mobile communication system according to an embodiment of the present disclosure, various changes could be made to FIG. 6A. For example, although shown as a series of operations, various operations in FIG. 6A could overlap, occur in parallel, occur in a different order, or occur multiple times.

Another example of a process of setting up a data path which supports that a UE performs a switching operation between a macro eNB and a small cell eNB in a mobile communication system according to an embodiment of the present disclosure is described below with reference to FIG. 6B.

Figure 6B:
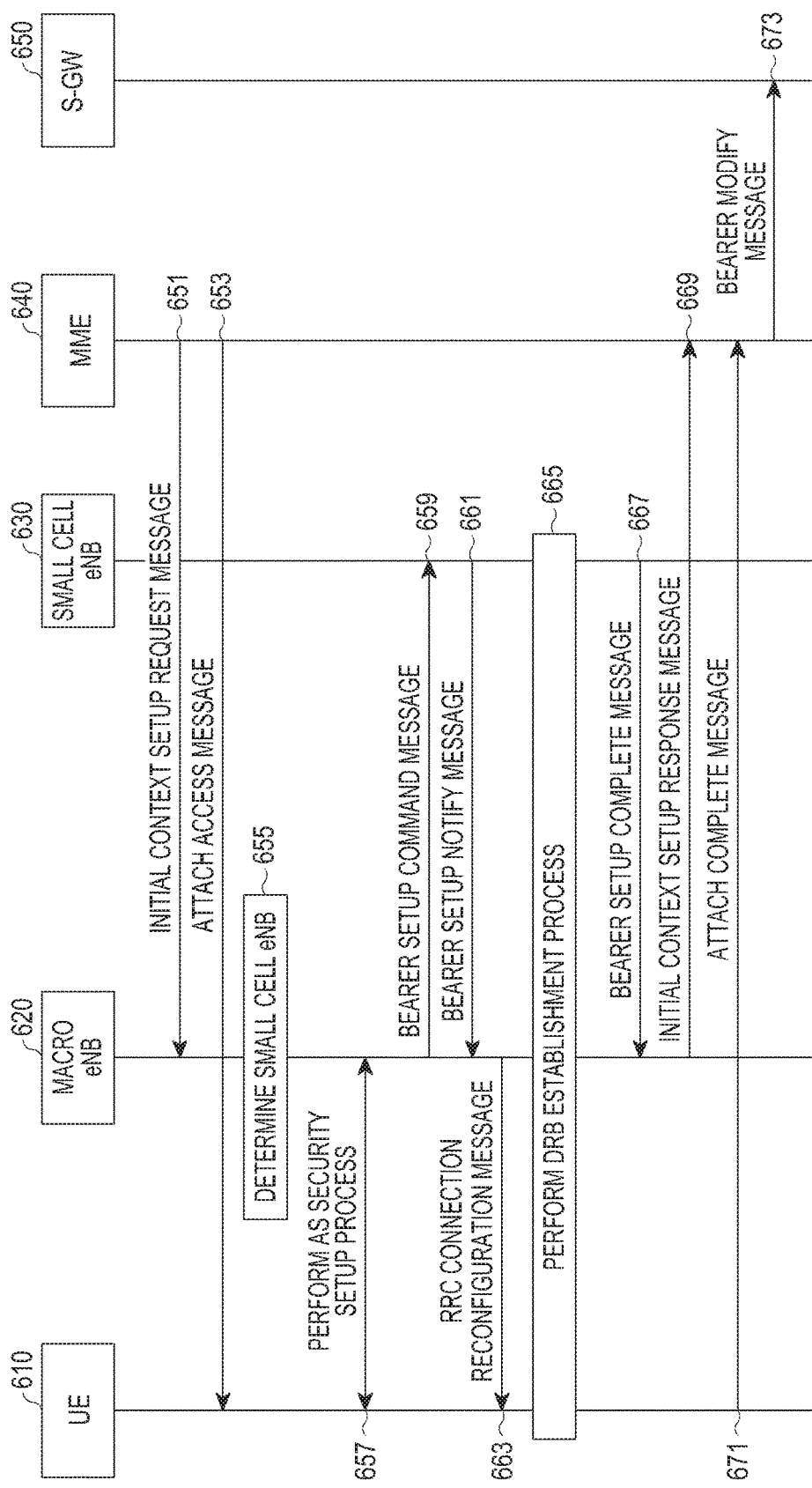
FIG. 6B schematically illustrates an example of a process of setting up a data path which supports that a UE performs a switching operation between a macro eNB and a small cell eNB in a mobile communication system according to an embodiment of the present disclosure.

FIG. 6B schematically illustrates another example of a process of setting up a data path which supports that a UE performs a switching operation between a macro eNB and a small cell eNB in a mobile communication system according to an embodiment of the present disclosure.

Referring to FIG. 6B, the mobile communication system includes a UE 610, a macro eNB 620, a small cell eNB 630, an MME 640, and a S-GW (or P-GW) 650.

The MME 640 transmits an initial context setup request message for the UE 610 to the macro eNB 620 which is connected to the UE 610 which performs a network entry process at operation 651. The MME 640 transmits an attach accept message to the UE 610 at operation 653. After receiving the initial context setup request message from the MME 640, the macro eNB 620 determines a small cell eNB from which the UE 610 will receive a service at operation 655.

After receiving the attach accept message from the MME 640, the UE 610 performs an AS security setup process with the macro eNB 620 at operation 657. After performing the AS security setup process with the UE 610, the macro eNB 620 transmits a bearer setup command message to the small cell eNB 630 at operation 659. The bearer setup command message is a message which commands to set up a data path, and includes a UE ID of a UE to which the small cell eNB 630 will provide a service, i.e., the UE 610, an X2 m-eNB TEID as a UE data path ID of a UE data path between the macro eNB 620 and the small cell eNB 630, an AS security key, and the like.

After receiving the bearer setup command message from the macro eNB 620, the small cell eNB 630 transmits a bearer setup notify message as a response message to the bearer setup command message to the macro eNB 620 at operation 661. After receiving the bearer setup notify message from the small cell eNB 630, the macro eNB 620 transmits a RRC connection reconfiguration message to the UE 610 at operation 663. The RRC connection reconfiguration message includes a small cell eNB ID of a small cell eNB from which the UE 610 will receive a service, i.e., the small cell eNB 630, switching indication information which commands the UE 610 to switch to a small cell eNB corresponding to the small cell eNB ID, information on a service which the UE 610 will receive from the small cell eNB 630, bearer parameters, information on a RACH resource which is used for the UE 610 to transmit a switch indicator indicating that the UE 610 switches to the small cell eNB 630 to the small cell eNB 630.

After receiving the RRC connection reconfiguration message from the macro eNB 620, the UE 610 switches to the small cell eNB 630 corresponding to information included in the RRC connection reconfiguration message, and performs a DRB establish process with the small cell eNB 630 at operation 665. After the DRB establish process between the UE 610 and the small cell eNB 630 is completed, the small cell eNB 630 transmits a bearer setup complete message indicating that a bearer setup has been completed to the macro eNB 620 at operation 667. The bearer setup complete message includes a UE ID of the UE 610, an X2 s-eNB TEID, and the like.

After receiving the bearer setup complete message from the small cell eNB 630, the macro eNB 620 transmits an initial context setup response message as a response message to the initial context setup message to the MME 640 at operation 669. The initial context setup response message includes an S1 eNB TEID, an EPS bearer ID, and the like. The EPS bearer ID denotes a UE data path ID of a UE data path between the macro eNB 620 and the S-GW 650, i.e., an ID of an EPS bearer between the macro eNB 620 and the S-GW 650.

After completing the DRB establish process with the small cell eNB 630, the UE 610 transmits an attach complete message indicating that a network attach has been completed to the MME 640 at operation 671. The attach complete message includes an EPS bearer ID. After receiving the attach complete message from the UE 610, the MME 640 transmits a modify bearer message to the S-GW 650 at operation 673. The modify bearer message includes an S1 eNB TEID, and an EPS bearer ID.

Although FIG. 6B illustrates another example of a process of setting up a data path which supports that a UE performs a switching operation between a macro eNB and a small cell eNB in a mobile communication system according to an embodiment of the present disclosure, various changes could be made to FIG. 6B. For example, although shown as a series of operations, various operations in FIG. 6B could overlap, occur in parallel, occur in a different order, or occur multiple times.

A process of switching to a macro eNB in order for a UE which receives a service from a small cell eNB to periodically report a measurement process performance result in a mobile communication system according to an embodiment of the present disclosure is described below with reference to FIG. 7.

Figure 7:
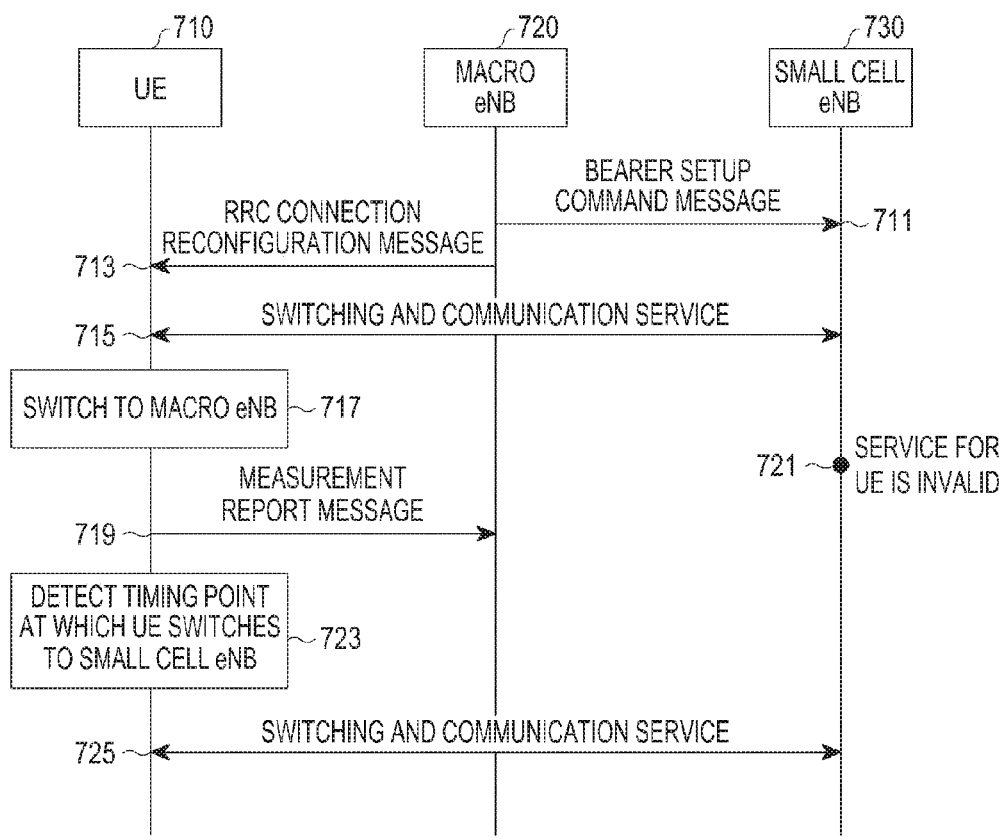
FIG. 7 schematically illustrates a process of switching to a macro eNB in order for a UE which receives a service from a small cell eNB to periodically report a measurement process performance result in a mobile communication system according to an embodiment of the present disclosure.

FIG. 7 schematically illustrates a process of switching to a macro eNB in order for a UE which receives a service from a small cell eNB to periodically report a measurement process performance result in a mobile communication system according to an embodiment of the present disclosure.

Referring to FIG. 7, the mobile communication system includes a UE 710, a macro eNB 720, and a small cell eNB 730.

The macro eNB 720 selects a small cell eNB which will provide a service to the UE 710, e.g., the small cell eNB 730, and transmits a bearer setup command message to the small cell eNB 730 at operation 711. The bearer setup command message includes a UE ID of the UE 710, UE frame configuration information for the UE 710, measurement process perform information for the UE 710, and the like. The measurement process perform information for the UE 710 included in the bearer setup command message includes measurement report period information as information on a period by which the UE 710 performs a measurement report process.

The macro eNB 720 transmits a RRC connection reconfiguration message to the UE 710 at operation 713. The RRC connection reconfiguration message includes small cell eNB information of a small cell eNB to which the UE 710 will switch, measurement configuration information, and UE frame configuration information. The measurement configuration information includes period information denoting a period by which the UE 710 performs a measurement report process, event condition information denoting an event condition at which the UE 710 performs the measurement report process, and the like. The UE 710 performs the measurement report process upon satisfying the event condition.

After receiving the RRC connection reconfiguration message from the macro eNB 720, the UE 710 switches to the small cell eNB 730 corresponding to the information included in the RRC connection reconfiguration message, and receives a service from the small cell eNB 730 at operation 715. If a current timing point is a timing point at which the UE 710 transmits a measurement process performance result to the macro eNB 720 corresponding to the measurement configuration information, i.e., a timing point at which the UE 710 transmits a measurement report message, the UE 710 switches from the small cell eNB 730 to the macro eNB 720 at operation 717. After switching to the macro eNB 720, the UE 710 transmits the measurement report message to the macro eNB 720 at operation 719. The time after the timing point at which the UE 710 switches to the macro eNB 720 for transmitting the measurement report message becomes the time during which a service for the UE 710 is invalid in the small cell eNB 730 at operation 721.

After transmitting the measurement report message to the macro eNB 720, the UE 710 detects that a current timing point is a timing point at which the UE 710 will switch to the small cell eNB 730 corresponding to UE frame configuration information at operation 723. Accordingly, the UE 710 switches to the small cell eNB 730, and receives a service from the small cell eNB 730 at operation 725.

The switching process in FIG. 7 is a switching process which occurs according to periodically reporting the measurement process performance result. However, it will be understood by those of ordinary skill in the art that the switching process may be periodically performed.

Although FIG. 7 illustrates a process of switching to a macro eNB in order for a UE which receives a service from a small cell eNB to periodically report a measurement process performance result in a mobile communication system according to an embodiment of the present disclosure, various changes could be made to FIG. 7. For example, although shown as a series of operations, various operations in FIG. 7 could overlap, occur in parallel, occur in a different order, or occur multiple times.

A process of switching to a macro eNB in order for a UE which receives a service from a small cell eNB to report a measurement process performance result according to event occurrence in a mobile communication system according to an embodiment of the present disclosure is described below with reference to FIG. 8.

Figure 8:
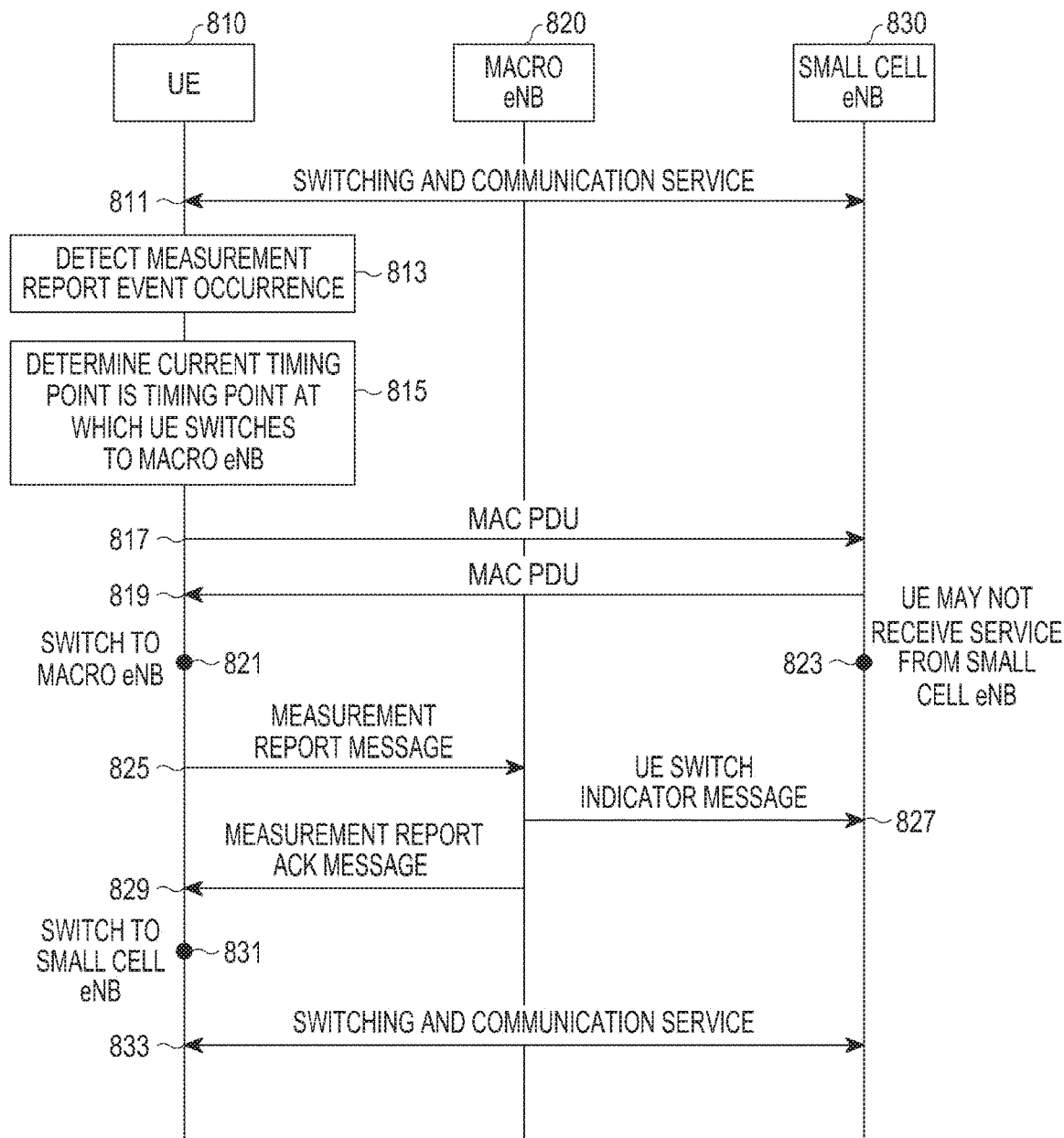
FIG. 8 schematically illustrates a process of switching to a macro eNB in order for a UE which receives a service from a small cell eNB to report a measurement process performance result according to event occurrence in a mobile communication system according to an embodiment of the present disclosure.

FIG. 8 schematically illustrates a process of switching to a macro eNB in order for a UE which receives a service from a small cell eNB to report a measurement process performance result according to event occurrence in a mobile communication system according to an embodiment of the present disclosure.

Referring to FIG. 8, the mobile communication system includes a UE 810, a macro eNB 820, and a small cell eNB 830.

The UE 810 switches to the small cell eNB 830 to receive a service from the small cell eNB 830 at operation 811. While receiving the service from the small cell eNB 830, the UE 810 detects that an event in which the UE 810 should report that a measurement process performance result occurs at operation 813. The UE 810 determines whether a current timing point is a timing point at which the UE 810 switches to the macro eNB 820 using UE frame configuration information at operation 815.

If the current timing point is not the timing point which the UE 810 switches to the macro eNB 820, the UE 810 transmits a medium access control protocol data unit (MAC PDU) including a switch indicator indicating that the UE 810 will switch to the macro eNB 820 to the small cell eNB 830 at operation 817. After receiving the MAC PDU from the UE 810, the macro eNB 820 transmits a switch confirm indicator indicating that the small cell eNB 830 has detected that the UE 810 will switch to the macro eNB 820 to the UE 810 at operation 819. The MPC PDUs at operations 817 and 819 may be one of layer 2 (L2) messages, codes which are transmitted through a physical layer (PHY) channel, codes which are transmitted through a channel quality indicator (CQI) channel, and codes which are transmitted through a RACH. Each of the codes may include the UE ID, or may be allocated to the UE 810 in advance.

If the current timing point is the timing point at which the UE 810 switches to the macro eNB 820, the UE 810 switches to the macro eNB 820 at operation 821. According to switching to the macro eNB 820, the UE 810 may not receive the service from the small cell eNB 830 at operation 823.

The UE 810 transmits a measurement report message including a measurement process performance result to the macro eNB 820 at operation 825. After receiving the measurement report message from the UE 810, the macro eNB 820 calculates a time during which the UE 810 should be connected to the macro eNB 820 and a timing point at which the UE 810 may switch to the small cell eNB 830 again. The macro eNB 820 transmits a UE switch indicator message to the small cell eNB 830 at operation 827. The UE switch indicator message includes reason information indicating why the UE 810 should be connected to the macro eNB 820 and time information indicating the time during which the UE 810 should be connected to the macro eNB 820. The macro eNB 820 transmits a measurement report acknowledgement (ACK) message as a response message to the measurement report message to the UE 810 at operation 829. The measurement report ACK message includes the time information indicating the time during which the UE 810 should be connected to the macro eNB 820.

After the time corresponding to the time information included in the measurement report ACK message has elapsed, the UE 810 switches to the small cell eNB 830 again if related time is included in a time interval during which the UE 810 receives the service from the small cell eNB 830 according to UE frame configuration information at operation 831. The UE 810 receives the service from the small cell eNB 830 at operation 833.

Although FIG. 8 illustrates a process of switching to a macro eNB in order for a UE which receives a service from a small cell eNB to report a measurement process performance result according to event occurrence in a mobile communication system according to an embodiment of the present disclosure, various changes could be made to FIG. 8. For example, although shown as a series of operations, various operations in FIG. 8 could overlap, occur in parallel, occur in a different order, or occur multiple times.

An example of a process of switching to a macro eNB in order for a UE to perform a RRC process in a mobile communication system according to an embodiment of the present disclosure is described below with reference to FIG. 9.

Figure 9:
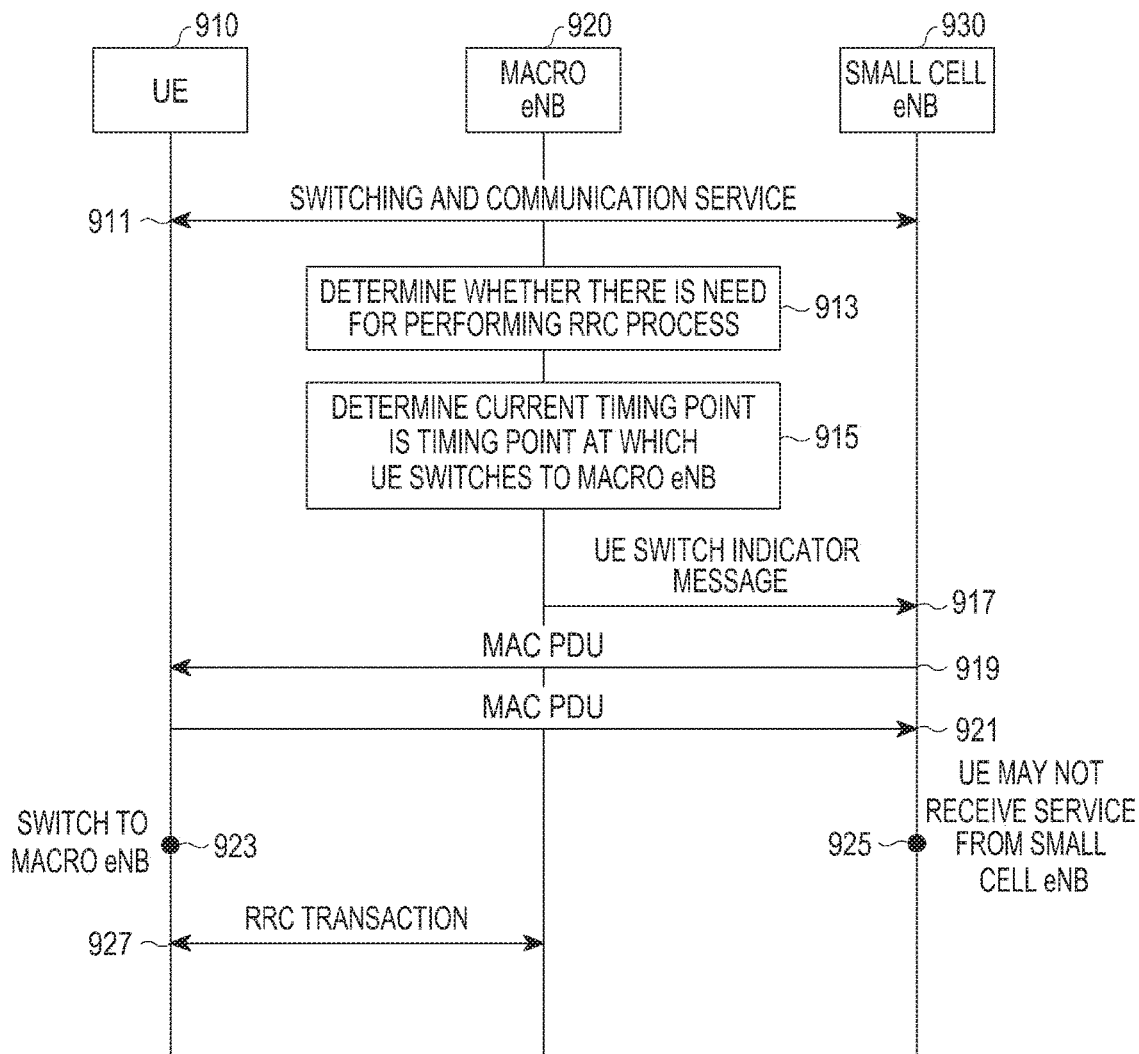
FIG. 9 schematically illustrates an example of a process of switching to a macro eNB in order for a UE to perform a radio resource control (RRC) process in a mobile communication system according to an embodiment of the present disclosure.

FIG. 9 schematically illustrates an example of a process of switching to a macro eNB in order for a UE to perform a RRC process in a mobile communication system according to an embodiment of the present disclosure.

Referring to FIG. 9, the mobile communication system includes a UE 910, a macro eNB 920, and a small cell eNB 930.

The UE 910 switches to the small cell eNB 930 to receive a service from the small cell eNB 930 at operation 911. While the UE 910 receives the service from the small cell eNB 930, the macro eNB 920 determines whether the UE 910 needs to perform a RRC process at operation 913. If the UE 910 needs to periodically transmit a measurement report message, or the UE 910 needs to transmit the measurement report message according to event occurrence, or a specific event occurs, the macro eNB 920 may determine that the UE 910 needs to perform the RRC process. If the UE 910 needs to perform the RRC process, the macro eNB 920 determines whether a current timing point is a timing point at which the UE 910 switches to the macro eNB 920 based on frame configuration information of the UE 910 at operation 915.

The macro eNB 920 calculates the time during which the UE 910 should be connected to the macro eNB 920 and a timing point at which the UE 910 may switch to the small cell eNB 930 again. The macro eNB 920 transmits a UE switch indicator message to the small cell eNB 930 at operation 917. The UE switch indicator message includes reason information indicating why the UE 910 should be connected to the macro eNB 920 and time information indicating the time during which the UE 910 should be connected to the macro eNB 920.

If the current timing point is not the timing point which the UE 910 should switch to the macro eNB 920, the small cell eNB 930 transmits a MAC PDU including switching indication information indicating that the UE 910 should switch to the macro eNB 920, the reason information why the UE 910 should switch to the macro eNB 920, and the time information indicating the time during which the UE 910 should be connected to the macro eNB 920 to the macro eNB 920 at operation 919. After receiving the MAC PDU from the small cell eNB 930, the UE 910 transmits a MAC PDU including a switch confirm indicator indicating that the UE 910 confirms a schedule for switching to the macro eNB 920 to the small cell eNB 930 at operation 921. The MPC PDUs at operations 919 and 921 may be one of an L2 message, a code which is transmitted through a PHY channel, a code which is transmitted through a CQI channel, and a code which is transmitted through a RACH. Each of the codes may include the UE ID, or may be allocated to the UE 910 in advance.

If the current timing point is the timing point at which the UE 910 should switch to the macro eNB 920, the UE 910 switches from the small cell eNB 930 to the macro eNB 920 at operation 923. According to switching from the small cell eNB 930 to the macro eNB 920, the UE 910 may not receive the service from the small cell eNB 930 at operation 925.

After switching from the small cell eNB 930 to the macro eNB 920, the UE 910 performs a RRC transaction, i.e., a RRC message transmitting/receiving process with the macro eNB 920 at operation 927. A RRC message transmitted from the macro eNB 920 to the UE 910 includes information on the time during which the UE 910 should be connected to the macro eNB 920.

Although FIG. 9 illustrates an example of a process of switching to a macro eNB in order for a UE to perform a RRC process in a mobile communication system according to an embodiment of the present disclosure, various changes could be made to FIG. 9. For example, although shown as a series of operations, various operations in FIG. 9 could overlap, occur in parallel, occur in a different order, or occur multiple times.

Another example of a process of switching to a macro eNB in order for a UE to perform a RRC process in a mobile communication system according to an embodiment of the present disclosure is described below with reference to FIG. 10.

Figure 10:
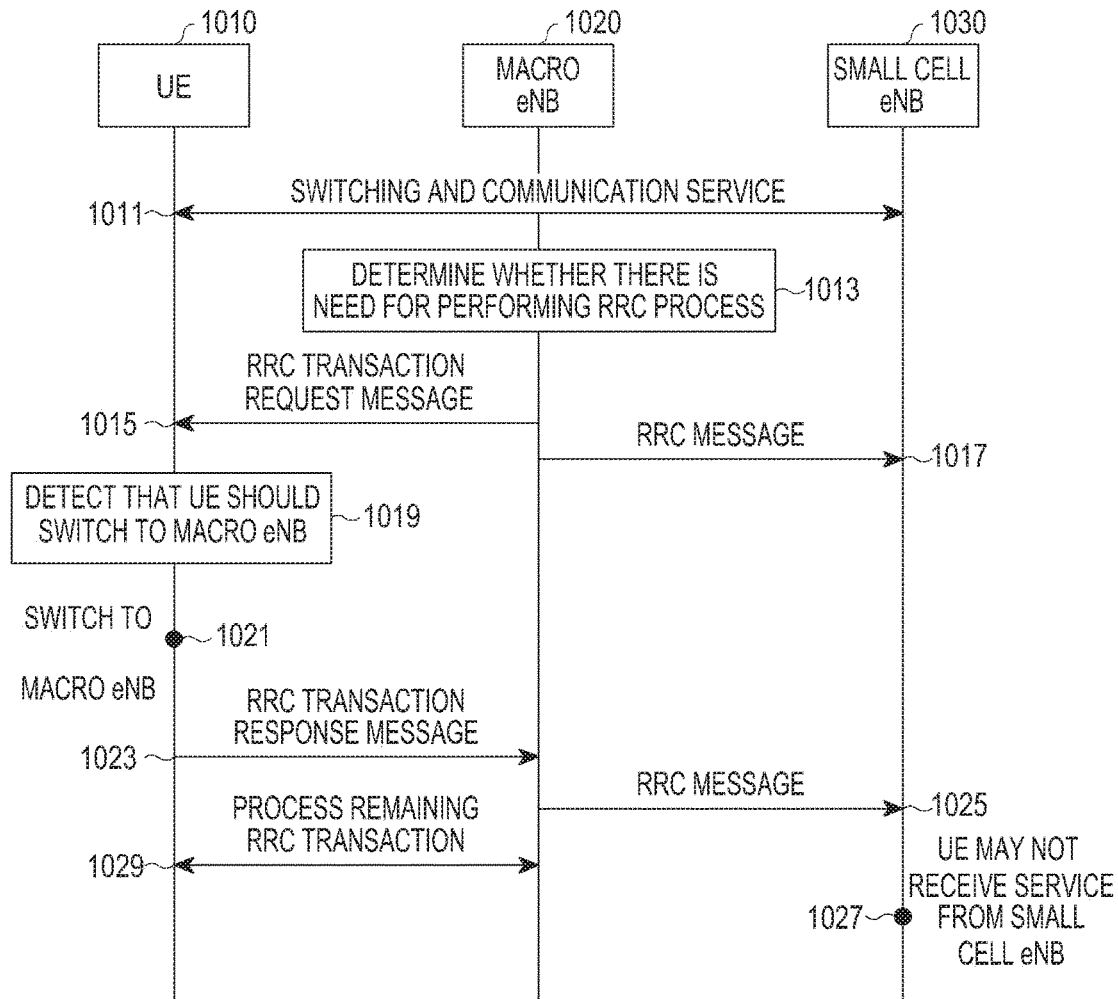
FIG. 10 schematically illustrates an example of a process of switching to a macro eNB in order for a UE to perform a RRC process in a mobile communication system according to an embodiment of the present disclosure.

FIG. 10 schematically illustrates another example of a process of switching to a macro eNB in order for a UE to perform a RRC process in a mobile communication system according to an embodiment of the present disclosure.

Referring to FIG. 10, the mobile communication system includes a UE 1010, a macro eNB 1020, and a small cell eNB 1030.

The UE 1010 switches to the small cell eNB 1030 to receive a service from the small cell eNB 1030 at operation 1011. In FIG. 10, the UE 1010 switches to the small cell eNB 1030 in order to receive only an uplink data packet from the small cell eNB 1030. The UE 1010 may receive a downlink data packet and a control signal without performing a switching operation between the macro eNB 1020 and the small cell eNB 1030.

While the UE 1010 receives the service from the small cell eNB 1030, the macro eNB 1020 determines whether the UE 1010 needs to perform a RRC process at operation 1013. If the UE 1010 needs to periodically transmit a measurement report message, or the UE 1010 needs to transmit the measurement report message according to event occurrence, or a specific event occurs, the macro eNB 1020 may determine that the UE 1010 needs to perform the RRC process.

If the UE 1010 needs to perform the RRC process, the macro eNB 1020 transmits a RRC transaction request message to the UE 1010 at operation 1015. The RRC transaction request message includes switching indication information indicating that the UE 1010 should switch to the macro eNB 1020 and information indicating time during which the UE 1010 should be connected to the macro eNB 1020. The RRC transaction request message indicates that a RRC control process is performed.

The macro eNB 1020 transmits a RRC message indicating that the UE 1010 should temporarily switch from the small cell eNB 1030 to the macro eNB 1020 to the small cell eNB 1030 at operation 1017. The RRC message includes a UE temporal switch indicator and a UE ID of the UE 1010, and the UE temporal switch indicator indicates that a related UE should temporarily switch from an eNB to which the related UE is currently connected to other eNB.

According to the reception of the RRC transaction request message from the macro eNB 1020, the UE 1010 detects that the UE 1010 should switch from the small cell eNB 1030 to the macro eNB 1020 at operation 1019 and switches from the small cell eNB 1030 to the macro eNB 1020 at operation 1021. The UE 1010 transmits a RRC transaction response message as a response message to the RRC transaction request message to the macro eNB 1020 at operation 1023.

After receiving the RRC transaction response message from the UE 1010, the macro eNB 1020 transmits a RRC message including a switch indicator indicating that the UE 1010 has switched from the small cell eNB 1030 to the macro eNB 1020 to the small cell eNB 1030 at operation 1025. The RRC message includes a reason why the UE 1010 should switch to the macro eNB 1020 and information on time during which the UE 1010 should be connected to the macro eNB 1020. After switching from the small cell eNB 1030 to the macro eNB 1020, the UE 1010 may not receive the service from the small cell eNB 1030 at operation 1027.

The UE 1010 and the macro eNB 1020 process remaining RRC transaction, and an uplink data packet of the UE 1010 may be served through the macro eNB 1020 while the UE 1010 is connected to the macro eNB 1020 at operation 1029.

Although FIG. 10 illustrates another example of a process of switching to a macro eNB in order for a UE to perform a RRC process in a mobile communication system according to an embodiment of the present disclosure, various changes could be made to FIG. 10. For example, although shown as a series of operations, various operations in FIG. 10 could overlap, occur in parallel, occur in a different order, or occur multiple times.

A process of switching to a macro eNB in order for a UE to resolve a connection failure with a small cell eNB in a mobile communication system according to an embodiment of the present disclosure will be described with reference to FIG. 11.

Figure 11:
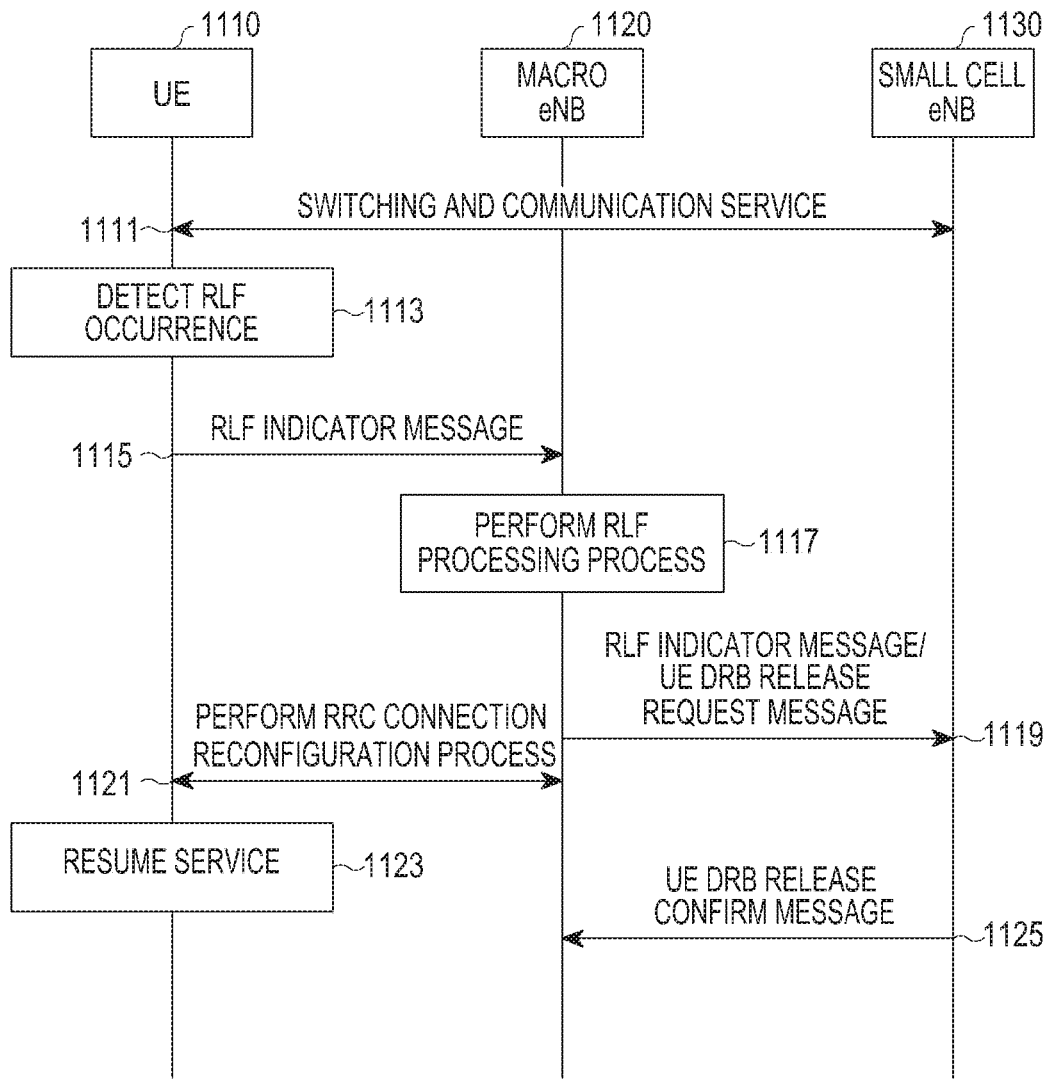
FIG. 11 schematically illustrates a process of switching to a macro eNB in order for a UE to resolve a connection failure with a small cell eNB in a mobile communication system according to an embodiment of the present disclosure.

FIG. 11 schematically illustrates a process of switching to a macro eNB in order for a UE to resolve a connection failure with a small cell eNB in a mobile communication system according to an embodiment of the present disclosure.

Referring to FIG. 11, the mobile communication system includes a UE 1110, a macro eNB 1120, and a small cell eNB 1130.

The UE 1110 switches to the small cell eNB 1130 to receive a service from the small cell eNB 1130 at operation 1111. While receiving the service from the small cell eNB 1130, the UE 1110 detects that an RLF between the UE 1110 and the small cell eNB 1130 occurs at operation 1113. The UE 1110 switches from the small cell eNB 1130 to the macro eNB 1120 to transmit an RLF indicator message to the macro eNB 1120 at operation 1115. The RLF indicator message is a message indicating that a RLF occurs, and may be implemented with an L2 message, a RRC message, a code which is transmitted through a PHY channel, a code which is transmitted through a CQI channel, or a code which is transmitted through a RACH channel. Each of the codes includes a UE ID of the UE 1110, or may be a code which is allocated to the UE 1110 in advance.

After receiving the RLF indicator message from the UE 1110, the macro eNB 1120 processes the RLF of the UE 1110 at operation 1117. Simultaneously, the macro eNB 1120 performs a process which searches a new small cell eNB which will provide a service to the UE 1110. The macro eNB 1120 transmits a RLF indicator message and a UE DRB release request message to the small cell eNB 1130 at operation 1119. The UE DRB release request message is a message which commands to release information and a resource which the small cell eNB 1130 maintains for providing the service to the UE 1110.

The macro eNB 1120 and the UE 1110 perform a RRC connection reconfiguration transaction process at operation 1121. According to performing the RRC connection reconfiguration transaction, the macro eNB 1120 informs the new small cell eNB which may provide the service to the UE 1110, or transmits a macro cell indicator indicating that the macro eNB 1120 directly provides the service to the UE 1110 to the UE 1110.

If a new small cell eNB not the macro eNB 1120 is determined to serve the UE 1110, the UE 1110 performs a process for resuming the service with the new small cell eNB. The process for resuming the service with new the small cell eNB includes a process in which the macro eNB 1120 transmits switching indication information indicating that the UE 1110 will switch to the new small cell eNB.

While performing the process for resuming the service with the new small cell eNB with the UE 1110, the macro eNB 1120 may directly provide a data packet to the UE 1110 at operation 1123.

After receiving the UE DRB release request message from the macro eNB 1120, the small cell eNB 1130 releases the information and the resource which the small cell eNB 1130 maintains for providing the service to the UE 1110, and transmits a UE DRB release confirm message as a response message to the UE DRB release request message to the macro eNB 1120 at operation 1125.

Although FIG. 11 illustrates a process of switching to a macro eNB in order for a UE to resolve a connection failure with a small cell eNB in a mobile communication system according to an embodiment of the present disclosure, various changes could be made to FIG. 11. For example, although shown as a series of operations, various operations in FIG. 11 could overlap, occur in parallel, occur in a different order, or occur multiple times.

A process of performing an initial attach process in a UE in a mobile communication system according to an embodiment of the present disclosure is described below with reference to FIG. 12.

Figure 12:
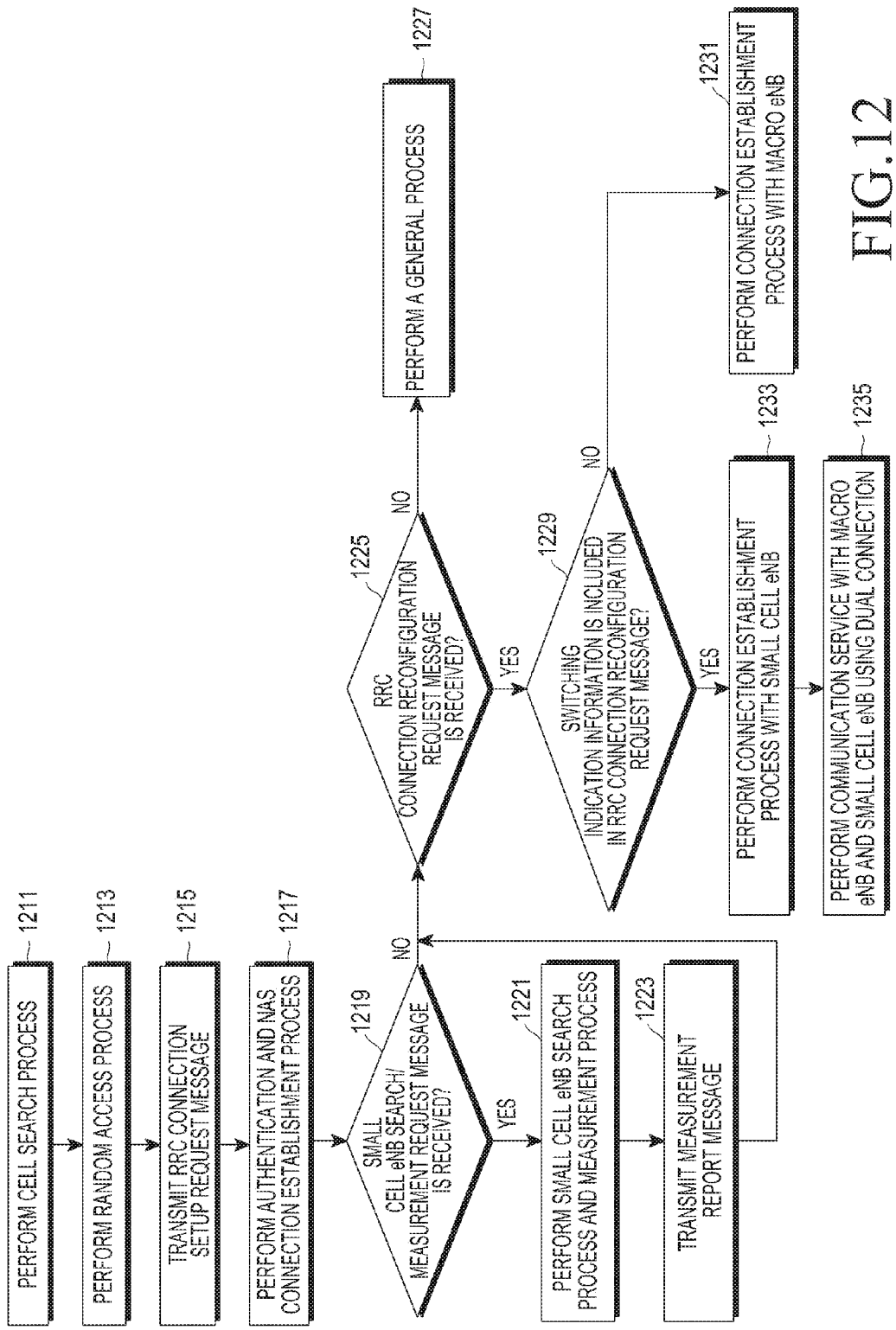
FIG. 12 schematically illustrates a process of performing an initial attach process in a UE in a mobile communication system according to an embodiment of the present disclosure.

FIG. 12 schematically illustrates a process of performing an initial attach process in a UE in a mobile communication system according to an embodiment of the present disclosure.

Referring to FIG. 12, after being powered on, the UE performs a cell search process at operation 1211. The cell search process corresponds to a process in which the UE selects a macro eNB. The UE selects the macro eNB corresponding to the result of the cell search process, and performs a random access process for attaching to the selected macro eNB at operation 1213. The UE transmits a RRC connection setup request message to the macro eNB at operation 1215. The RRC connection setup request message includes dual connection support information indicating whether the UE supports a dual connection with the macro eNB and a small cell eNB.

The UE performs an authentication and on-access stratum (NAS) connection establishment process through the macro eNB at operation 1217. The UE determines whether a small cell eNB search/measurement request message is received from the macro eNB at operation 1219. If the small cell eNB search/measurement request message is received from the macro eNB, the UE performs a small cell eNB search process and a measurement process corresponding to information included in the small cell eNB search/measurement request message at operation 1221. The UE transmits a measurement report message including the result of performing the small cell eNB search process and the measurement process to the macro eNB at operation 1223.

If the small cell eNB search/measurement request message is not received from the macro eNB, the UE determines whether a RRC connection reconfiguration request message is received from the macro eNB at operation 1225. If the RRC connection reconfiguration request message is not received from the macro eNB, the UE performs a general process which is performed in a case that the RRC connection reconfiguration request message is not received from the macro eNB in a general mobile communication system at operation 1227. The general process which is performed in the case that the RRC connection reconfiguration request message is not received from the macro eNB in the general mobile communication system will be omitted herein.

If the small cell eNB search/measurement request message is received from the macro eNB, the UE determines whether switching indication information is included in the RRC connection reconfiguration request message at operation 1229. If the switching indication information is not included in the RRC connection reconfiguration request message, the UE performs a connection establishment process with the macro eNB at operation 1231.

If the switching indication information is included in the RRC connection reconfiguration request message, the UE switches to the small cell eNB and performs a connection establishment process with the small cell eNB at operation 1233. The UE uses a dual connection with the macro eNB and the small cell eNB based on UE frame configuration information to receive a communication service at operation 1235.

In FIG. 12, the UE performs the authentication and NAS connection establishment process, determines whether the small cell eNB search/measurement request message is received from the macro eNB, and performs the search and measurement process for the small cell eNB based on the determined result. However, it will be understood by those of ordinary skill in the art that the UE may directly perform an operation of determining whether a RRC reconfiguration request message is received from the macro eNB without performing the search and measurement process for the small cell eNB, i.e., an operation as described in operation 1225.

Although FIG. 12 illustrates a process of performing an initial attach process in a UE in a mobile communication system according to an embodiment of the present disclosure, various changes could be made to FIG. 12. For example, although shown as a series of operations, various operations in FIG. 12 could overlap, occur in parallel, occur in a different order, or occur multiple times.

A process of periodically reporting a measurement process performance result in a UE in a mobile communication system according to an embodiment of the present disclosure is described below with reference to FIG. 13.

Figure 13:
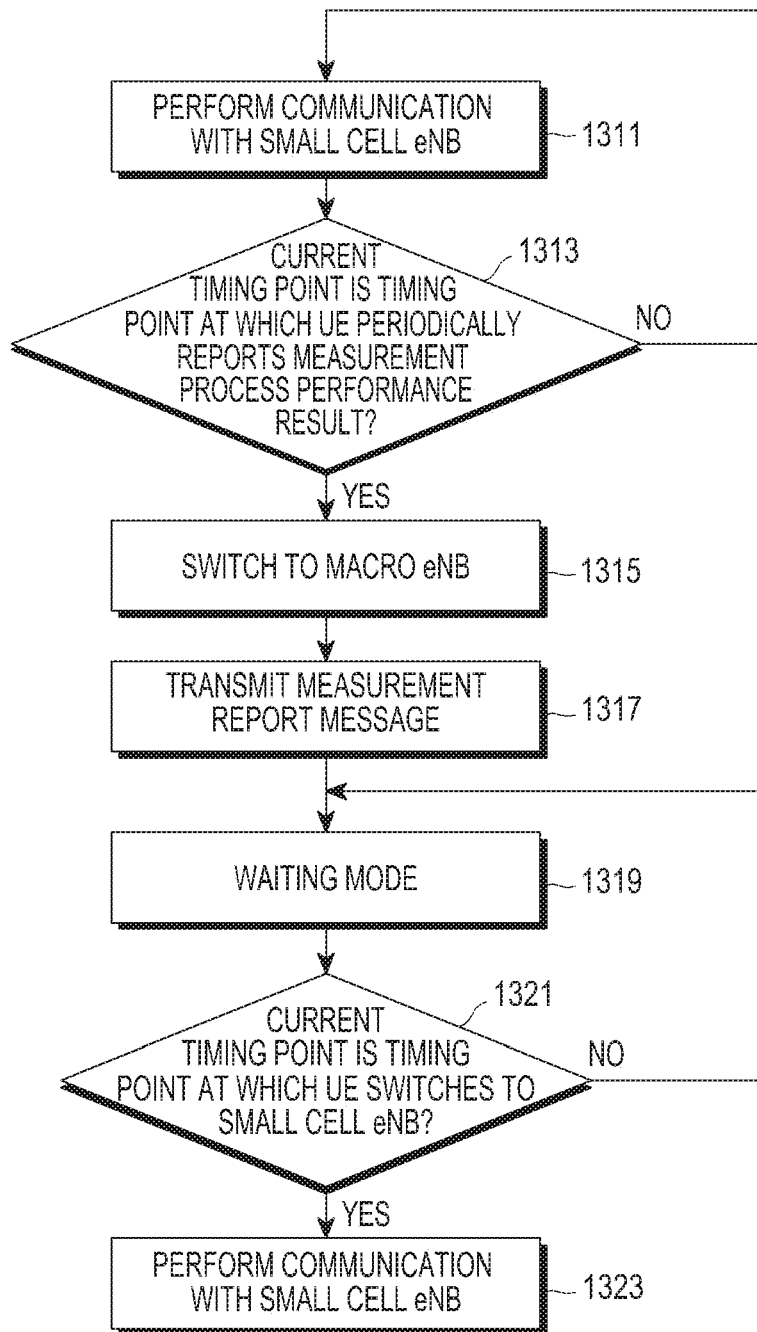
FIG. 13 schematically illustrates a process of periodically reporting a measurement process performance result in a UE in a mobile communication system according to an embodiment of the present disclosure.

FIG. 13 schematically illustrates a process of periodically reporting a measurement process performance result in a UE in a mobile communication system according to an embodiment of the present disclosure.

Referring to FIG. 13, while switching to a small cell eNB to receive a service from the small cell eNB at operation 1311, the UE determines whether a current timing point is a timing point at which the UE periodically reports a measurement process performing result corresponding to measurement operation information received from a macro eNB at operation 1313. If the current timing point is the timing point at which the UE periodically reports the measurement process performing result, the UE switches from the small cell eNB to the macro eNB since the UE currently receives the service from the small cell eNB at operation 1315. The UE transmits a measurement report message including the measurement process performing result to the macro eNB at operation 1317.

The UE operates in a waiting mode until a timing point at which the UE switches from the macro eNB to the small cell eNB again corresponding to UE frame configuration information at operation 1319, and determines a current timing point is the timing point at which the UE switches from the macro eNB to the small cell eNB again at operation 1321. If the current timing point is the timing point at which the UE switches from the macro eNB to the small cell eNB again, the UE switches from the macro eNB to the small cell eNB and receives a service from the small cell eNB at operation 1323.

If the current timing point is not the timing point at which the UE switches from the macro eNB to the small cell eNB again, the UE returns to operation 1319 to wait until the timing point at which the UE switches from the macro eNB to the small cell eNB again.

Although FIG. 13 illustrates a process of periodically reporting a measurement process performance result in a UE in a mobile communication system according to an embodiment of the present disclosure, various changes could be made to FIG. 13. For example, although shown as a series of operations, various operations in FIG. 13 could overlap, occur in parallel, occur in a different order, or occur multiple times.

A process of reporting a measurement process performance result according to event occurrence in a UE in a mobile communication system according to an embodiment of the present disclosure is described below with reference to FIG. 14.

Figure 14:
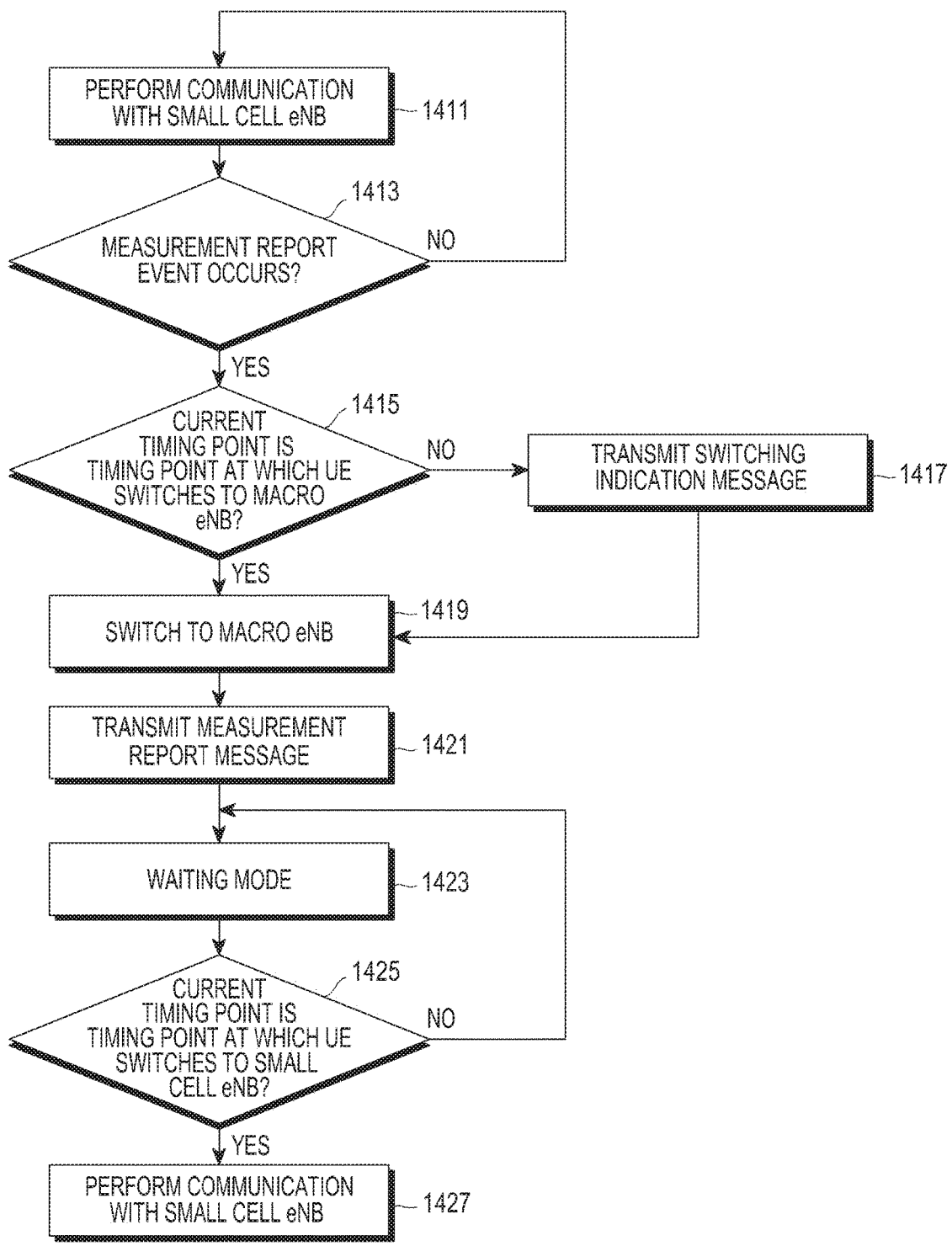
FIG. 14 schematically illustrates a process of reporting a measurement process performance result according to event occurrence in a UE in a mobile communication system according to an embodiment of the present disclosure.

FIG. 14 schematically illustrates a process of reporting a measurement process performance result according to event occurrence in a UE in a mobile communication system according to an embodiment of the present disclosure.

Referring to FIG. 14, while switching to a small cell eNB to receive a service from the small cell eNB at operation 1411, the UE determines whether an event that the UE reports measurement process performing result according to measurement operation information received from the macro eNB occurs at operation 1413. If the event occurs, the UE determines whether a timing point is a timing point at which the UE switches to the macro eNB based on UE frame configuration information at operation 1415.

If the timing point is not the timing point at which the UE switches to the macro eNB, the UE transmits a message indicating that the UE will temporarily switch from the small cell eNB to the macro eNB to the small cell eNB at operation 1417. The message includes a UE temporal switch indicator and a UE ID of the UE, and the UE temporal switch indicator indicates that a related UE should temporarily switch from an eNB to which the related UE is currently connected to other eNB. The message may be implemented with one of an L2 message, a code which is transmitted through an arbitrary PHY channel, a code which is transmitted through a CQI channel, a code which is transmitted through a RACH, and the like. Each of the codes includes the UE ID of the UE, or is a code which is allocated to the UE.

If the timing point is the timing point at which the UE switches to the macro eNB, the UE switches from the small cell eNB to the macro eNB since the UE currently receives a communication service form the small cell eNB at operation 1421. The UE transmits a measurement report message including a measurement process performing result to the macro eNB at operation 1421. The UE operates in a waiting mode until a timing point at which the UE switches from the macro eNB to the small cell eNB again corresponding to UE frame configuration information at operation 1423, and determines a current timing point is the timing point at which the UE switches from the macro eNB to the small cell eNB again at operation 1425. If the current timing point is the timing point at which the UE switches from the macro eNB to the small cell eNB again, the UE switches from the macro eNB to the small cell eNB and receives the communication service from the small cell eNB at operation 1427.

If the current timing point is not the timing point at which the UE switches from the macro eNB to the small cell eNB again, the UE returns to operation 1423 to wait until the timing point at which the UE switches from the macro eNB to the small cell eNB again.

Although FIG. 14 illustrates a process of reporting a measurement process performance result according to event occurrence in a UE in a mobile communication system according to an embodiment of the present disclosure, various changes could be made to FIG. 14. For example, although shown as a series of operations, various operations in FIG. 14 could overlap, occur in parallel, occur in a different order, or occur multiple times.

A UE operating process in a case that a RLF occurs in a connection between a UE and a small cell eNB in a mobile communication system according to an embodiment of the present disclosure is described below with reference to FIG. 15.

Figure 15:
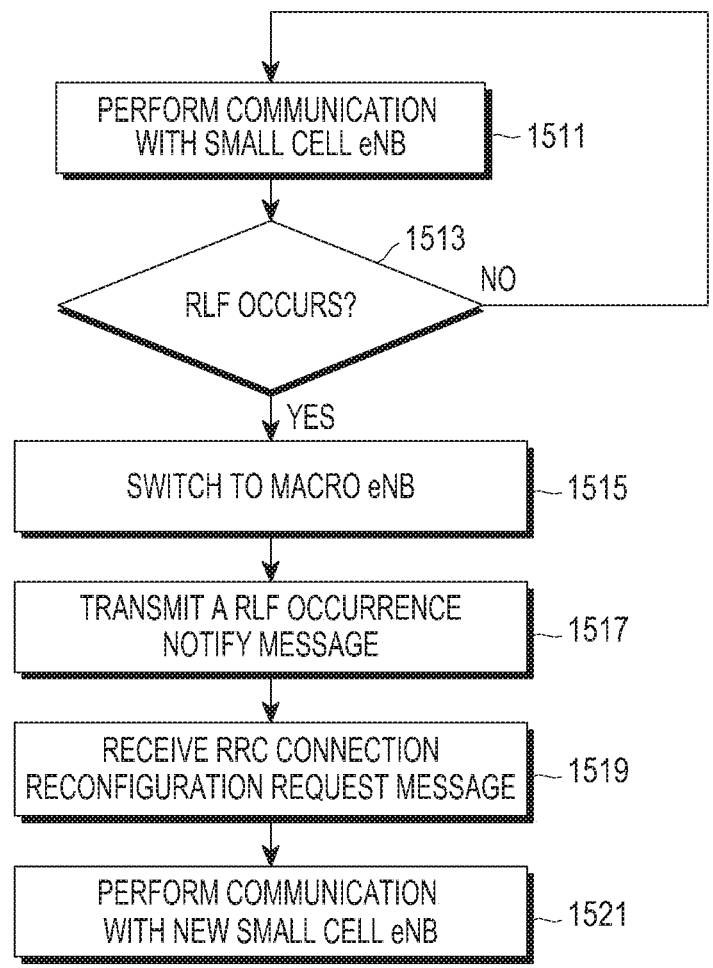
FIG. 15 schematically illustrates a UE operating process in a case that a radio link failure (RLF) occurs in a connection between a UE and a small cell eNB in a mobile communication system according to an embodiment of the present disclosure.

FIG. 15 schematically illustrates a UE operating process in a case that a RLF occurs in a connection between a UE and a small cell eNB in a mobile communication system according to an embodiment of the present disclosure.

Referring to FIG. 15, while switching to a small cell eNB to receive a service from the small cell eNB at operation 1511, the UE determines whether a RLF occurs in a connection between the UE and the small cell eNB at operation 1513.

If the RLF occurs in the connection between the UE and the small cell eNB, the UE switches from the small cell eNB to the macro eNB at operation 1515. The UE transmits a message indicating that the RLF occurs in the connection between the UE and the small cell eNB to the macro eNB at operation 1517.

The UE receives a RRC connection reconfiguration message from the macro eNB at operation 1519. The RRC connection reconfiguration message includes information on a new small cell eNB from which the UE will receive the service, or information indicating that the UE should receive the service from the macro eNB. In FIG. 15, it will be assumed that the information included in the RRC connection reconfiguration message which is received from the macro eNB is the information indicating that the UE should receive the service from the new small cell eNB.

The UE performs a connection establishment process with the new small cell eNB in operation 1521 according to the information included in the RRC connection reconfiguration message which is received from the macro eNB to receive a service from the new small cell eNB.

If the information included in the RRC connection reconfiguration message which is received from the macro eNB is the information indicating that the UE should receive the service from the macro eNB, it will be understood by those of ordinary skill in the art that the UE no longer performs the connection establishment process with the small cell eNB, and may directly receive the service from the macro eNB.

Although FIG. 15 illustrates a UE operating process in a case that a RLF occurs in a connection between a UE and a small cell eNB in a mobile communication system according to an embodiment of the present disclosure, various changes could be made to FIG. 15. For example, although shown as a series of operations, various operations in FIG. 15 could overlap, occur in parallel, occur in a different order, or occur multiple times.

A process of performing an initial attach process with a UE in a macro eNB in a mobile communication system according to an embodiment of the present disclosure is described below with reference to FIG. 16.

Figure 16:
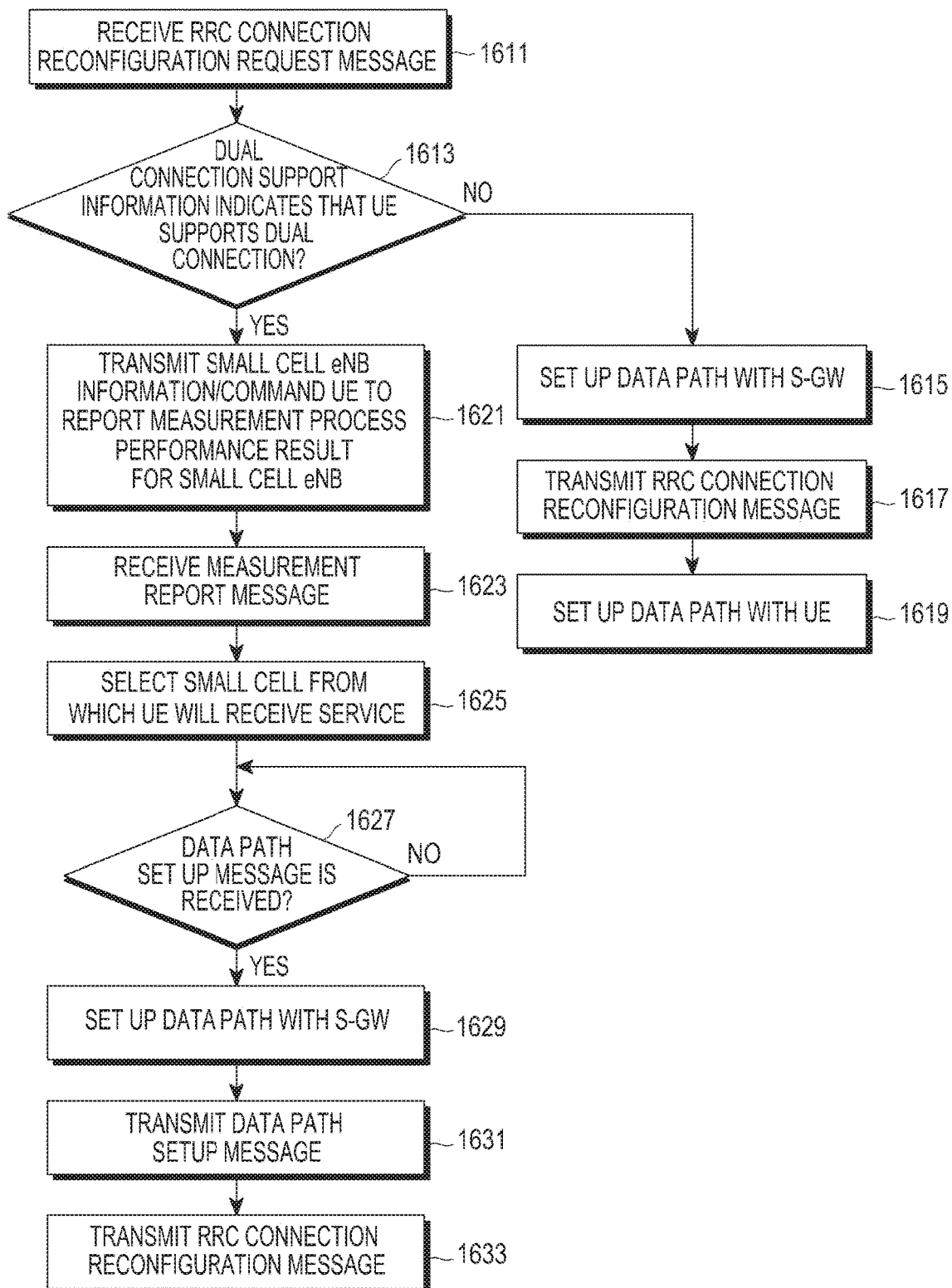
FIG. 16 schematically illustrates a process of performing an initial attach process with a UE in a macro eNB in a mobile communication system according to an embodiment of the present disclosure.

FIG. 16 schematically illustrates a process of performing an initial attach process with a UE in a macro eNB in a mobile communication system according to an embodiment of the present disclosure.

Referring to FIG. 16, the macro eNB receives a RRC connection setup request message from a UE at operation 1611. The RRC connection setup request message includes dual connection support information indicating whether the UE supports a dual connection. The macro eNB determines whether the dual connection support information included in the RRC setup request message indicates that the UE supports the dual connection at operation 1613. If the dual connection support information does not indicate that the UE supports the dual connection, the macro eNB receives a data path setup message from a core network, i.e., an S-GW, to setup a data path with the S-GW at operation 1615. The macro eNB transmits a RRC connection reconfiguration message to the UE at operation 1617. The macro eNB sets up a data path with the UE at operation 1619.

If the dual connection support information indicates that the UE supports the dual connection, the macro eNB transmits information on a small cell eNB to the UE and commands the UE to report measurement process performing result for the small cell eNB at the same time in order to determine the small cell eNB from which the UE will receive a service at operation 1621. The macro eNB receives a measurement report message including measurement process performing result for the small cell eNB from the UE at operation 1623. The macro eNB selects the small cell eNB from which the UE will receive a service based on the measurement process performing result included in the measurement report message which is received from the UE at operation 1625.

The macro eNB determines whether a data path setup message which commands the UE to set up a data path from the S-GW at operation 1627. If the data path setup message is received from the S-GW, the macro eNB sets up a data path with the S-GW at operation 1629. The macro eNB transmits a data path setup message which commands to set up a data path with the S-GW to the selected small cell eNB which provides the service to the UE at operation 1631. The macro eNB transmits a RRC connection reconfiguration message to the UE at operation 1633. The RRC connection reconfiguration message includes information on the small cell eNB from which the UE will receive the service.

In FIG. 16, as described in operation 1631, the macro eNB commands the UE to set up the data path with the S-GW. However, it will be understood by those of ordinary skill in the art that the macro eNB may command the UE to set up a data path with the macro eNB not the S-GW.

Although FIG. 16 illustrates a process of performing an initial attach process with a UE in a macro eNB in a mobile communication system according to an embodiment of the present disclosure, various changes could be made to FIG. 16. For example, although shown as a series of operations, various operations in FIG. 16 could overlap, occur in parallel, occur in a different order, or occur multiple times.

A process of performing an initial attach process with a UE in a small cell eNB in a mobile communication system according to an embodiment of the present disclosure will be described with reference to FIG. 17.

Figure 17:
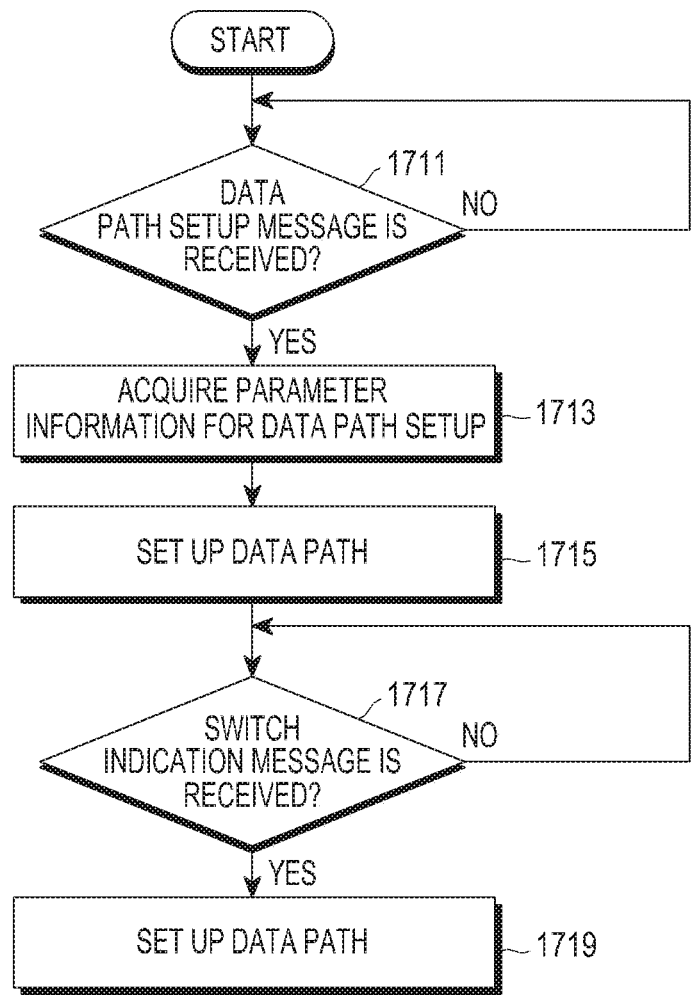
FIG. 17 schematically illustrates a process of performing an initial attach process with a UE in a small cell eNB in a mobile communication system according to an embodiment of the present disclosure.

FIG. 17 schematically illustrates a process of performing an initial attach process with a UE in a small cell eNB in a mobile communication system according to an embodiment of the present disclosure.

Referring to FIG. 17, the small cell eNB determines whether a data path setup message which commands a UE to set up a data path with an S-GW is received from a macro eNB at operation 1711. If the data path setup message is received, the small cell eNB acquires parameter information necessary for setting up a data path for the UE from the data path setup message at operation 1713. The small cell eNB sets up the data path for the UE based on the acquired parameter information with the S-GW at operation 1715. The small cell eNB determines whether a message including a switch indicator indicating that the UE has switched to the small cell eNB is received from the UE at operation 1717. If the message including the switch indicator is received from the UE, the small cell eNB sets up a data path with the UE at operation 1719.

Alternatively, if the macro eNB and the small cell eNB directly set up the data path for the UE without passing the S-GW, the small cell eNB receives the parameter information from the macro eNB and awaits reception of a message including the switch indicator from the UE.

Although FIG. 17 illustrates a process of performing an initial attach process with a UE in a small cell eNB in a mobile communication system according to an embodiment of the present disclosure, various changes could be made to FIG. 17. For example, although shown as a series of operations, various operations in FIG. 17 could overlap, occur in parallel, occur in a different order, or occur multiple times.

A process of managing a data path among a macro eNB, a small cell eNB, and GWs for supporting a switching operation between a macro eNB and a small cell eNB in a mobile communication system according to an embodiment of the present disclosure is described below with reference to FIGS. 18A and 18B.

First, an example of a process of managing a data path among a macro eNB, a small cell eNB, and GWs for supporting a switching operation between a macro eNB and a small cell eNB in a mobile communication system according to an embodiment of the present disclosure is described below with reference to FIG. 18A.

Figure 18A:
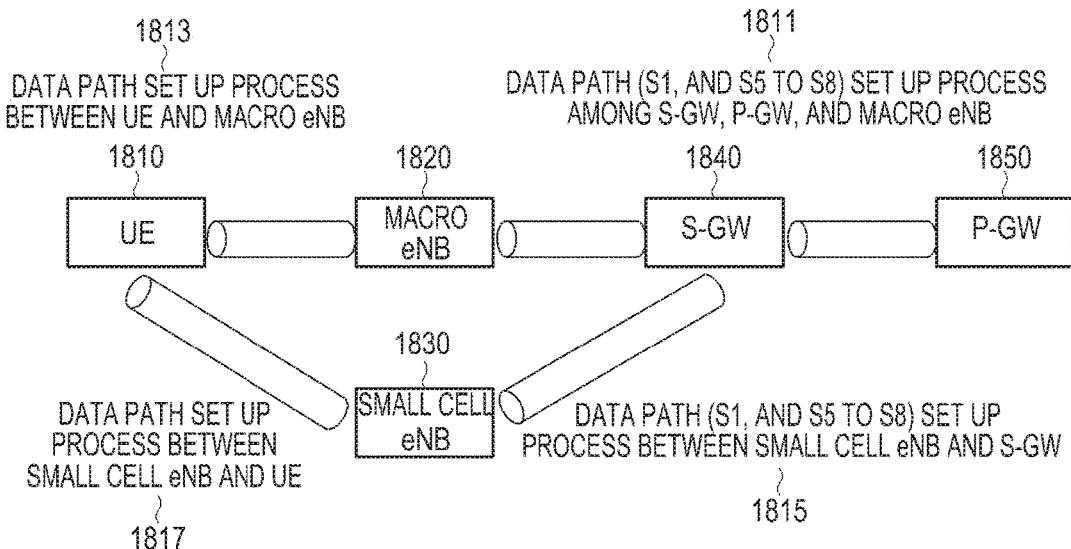
FIG. 18A schematically illustrates an example of a process of managing a data path among a macro eNB, a small cell eNB, and GWs for supporting a switching operation between a macro eNB and a small cell eNB in a mobile communication system according to an embodiment of the present disclosure.

FIG. 18A schematically illustrates an example of a process of managing a data path among a macro eNB, a small cell eNB, and GWs for supporting a switching operation between a macro eNB and a small cell eNB in a mobile communication system according to an embodiment of the present disclosure.

Referring to FIG. 18A, the process of managing the data path in FIG. 18A indicates a process of managing a data path in a case that a data path for transferring a data packet for a UE is established between the small cell eNB and an S-GW.

The mobile communication system includes a UE 1810, a macro eNB 1820, a small cell eNB 1830, an S-GW 1840, and a P-GW 1850.

A data path setup process according to providing a service to the UE 1810 which attaches to the macro eNB 1820 includes a data path (S1, and S5 to S8) setup process 1811 among the S-GW 1840, the P-GW 1850, and the macro eNB 1820 and a data path setup process 1813 between the UE 1810 and the macro eNB 1820.

If the UE 1810 receives a data service from the small cell eNB 1830, a data path setup process includes a data path (S1, and S5 to S8) setup process 1815 between the small cell eNB 1830 and the S-GW 1840 and a data path setup process 1817 between the small cell eNB 1830 and the UE 1810. If the S-GW 1840 does not recognize the data path setup with the small cell eNB 1830, the S-GW 1840 recognizes the small cell eNB 1830 as the macro eNB 1820, and the small cell eNB 1830 acquires a parameter necessary for the data path setup with the S-GW 1840 from the macro eNB 1820. Here, the service which is provided to the UE 1810 through the data path setup process and quality of service (QoS) parameter information corresponding to the service which is provided to the UE 1810 are exchanged.

Another example of a process of managing a data path among a macro eNB, a small cell eNB, and GWs for supporting a switching operation between a macro eNB and a small cell eNB in a mobile communication system according to an embodiment of the present disclosure is described below with reference to FIG. 18B.

Figure 18B:
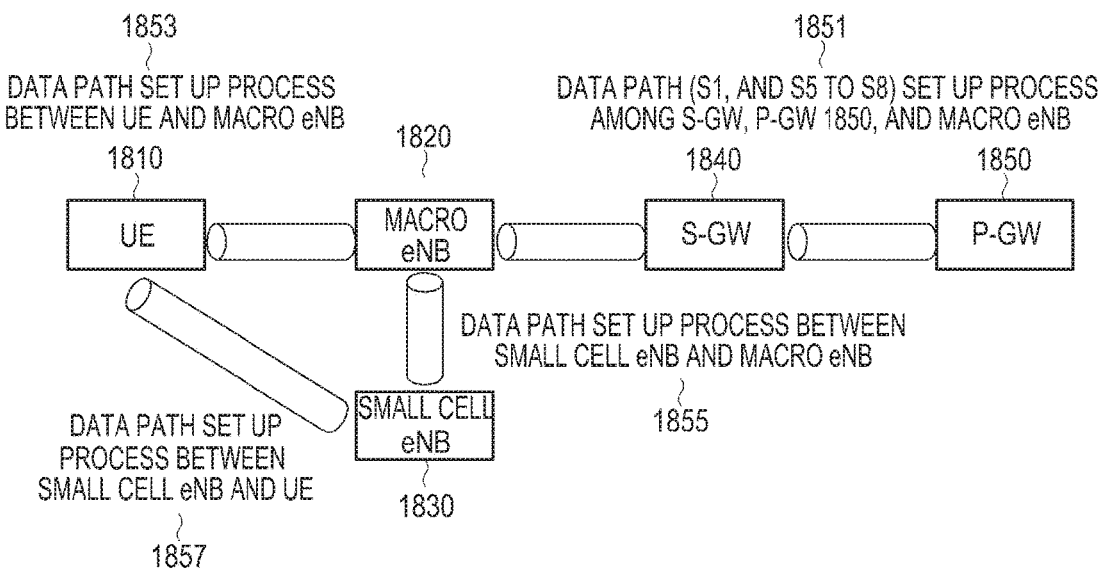
FIG. 18B schematically illustrates an example of a process of managing a data path among a macro eNB, a small cell eNB, and GWs for supporting a switching operation between a macro eNB and a small cell eNB in a mobile communication system according to an embodiment of the present disclosure.

FIG. 18B schematically illustrates another example of a process of managing a data path among a macro eNB, a small cell eNB, and GWs for supporting a switching operation between a macro eNB and a small cell eNB in a mobile communication system according to an embodiment of the present disclosure.

Referring to FIG. 18B, the process of managing the data path in FIG. 18B indicates a process of managing a data path in a case that a data path for transferring a data packet for a UE is established between the small cell eNB and the macro eNB.

The mobile communication system includes a UE 1810, a macro eNB 1820, a small cell eNB 1830, an S-GW 1840, and a P-GW 1850.

A data path setup process according to providing a service to the UE 1810 which attaches to the macro eNB 1820 includes a data path (S1, and S5 to S8) setup process 1851 among the S-GW 1840, the P-GW 1850, and the macro eNB 1820 and a data path setup process 1853 between the UE 1810 and the macro eNB 1820.

If the UE 1810 receives a data service from the small cell eNB 1830, a data path setup process includes a data path setup process 1855 between the small cell eNB 1830 and the macro eNB 1820 and a data path setup process 1857 between the small cell eNB 1830 and the UE 1810.

The service which is provided to the UE 1810 through the data path setup process and QoS parameter information corresponding to the service which is provided to the UE 1810 are exchanged.

Another example of a process of supporting a switching operation between a macro eNB and a small cell eNB in a mobile communication system according to an embodiment of the present disclosure is described below with reference to FIG. 19.

Figure 19:
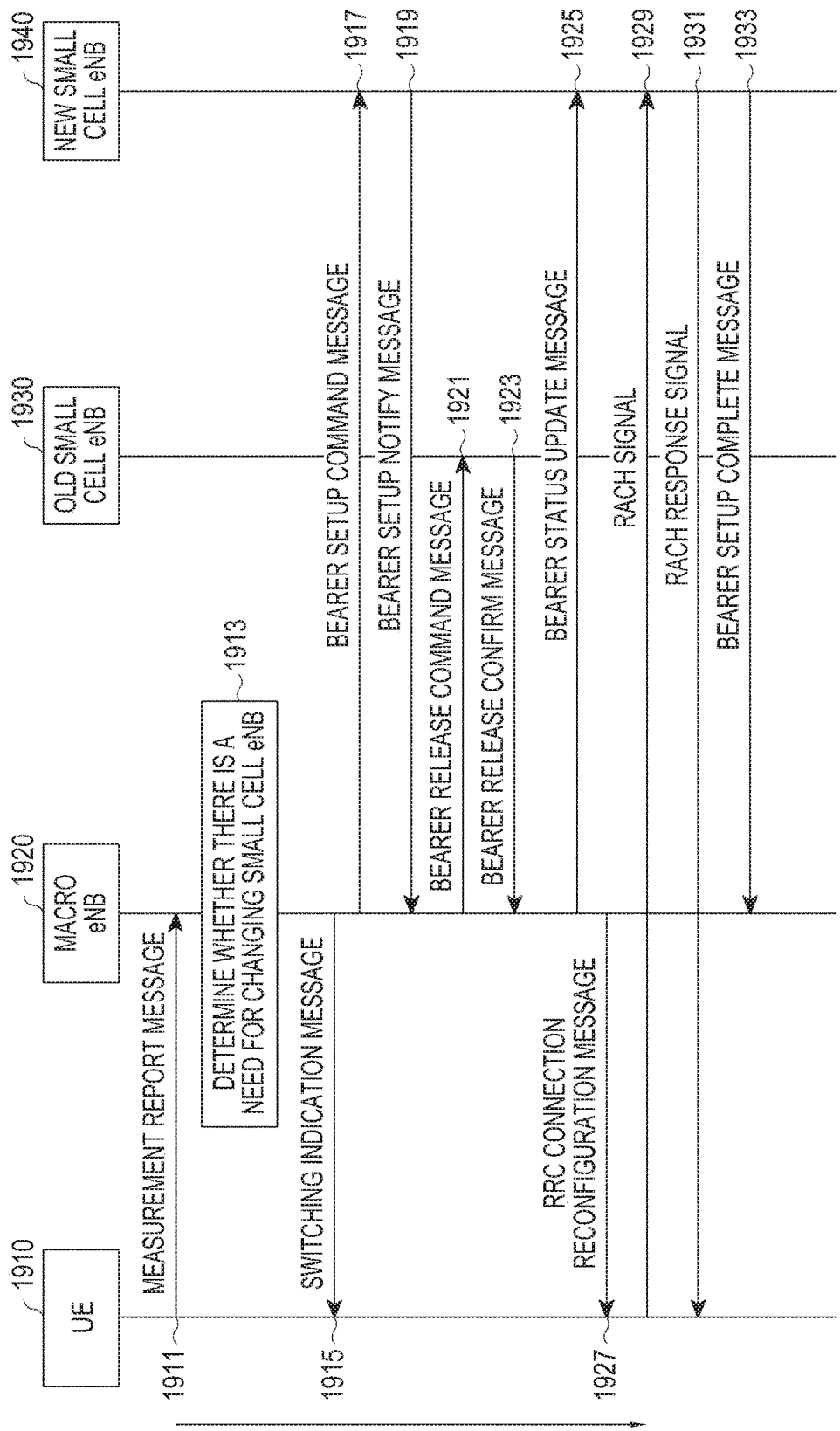
FIG. 19 schematically illustrates an example of a process of supporting a switching operation between a macro eNB and a small cell eNB in a mobile communication system according to an embodiment of the present disclosure.

FIG. 19 schematically illustrates another example of a process of supporting a switching operation between a macro eNB and a small cell eNB in a mobile communication system according to an embodiment of the present disclosure.

Referring to FIG. 19, the mobile communication system includes a UE 1910, a macro eNB 1920, an old small cell eNB 1930, and a new S-GW 1940.

The UE 1910 transmits a measurement report message to the macro eNB 1920 at operation 1911. After receiving the measurement report message from the UE 1910, the macro eNB 1920 determines whether there is a need for changing a small cell eNB which provides a service to the UE 1910 based on information included in the measurement report message at operation 1913. The macro eNB 1920 transmits a switching indication message including switching indication information indicating that the UE 1910 should switch from an old small cell eNB from which the UE 1910 currently receives a service as an old small cell eNB 1930 to a new small cell eNB, i.e., a new small cell eNB 1940, to the UE 1910 at operation 1915. The switching indication message may include information indicating time during which the UE 1910 will be connected to the old small cell eNB 1930.

The macro eNB 1920 transmits a bearer setup command message as a data path setup command message which commands to set up a data path with the UE 1910 to the new small cell eNB 1940 at operation 1917. The bearer setup command message may include a UE ID of the UE 1910, an X2 m-eNB TEID as path setup information for the UE 1910 between the macro eNB 1920 and the new small cell eNB 1940 (or S1 m-eNB TEID as path setup information for the UE 1910 between the new small cell eNB 1940 and a S-GW (not shown in FIG. 19)), AS security information of the UE 1910, and the like. After receiving the bearer setup command message from the macro eNB 1920, the new small cell eNB 1940 transmits a bearer setup notify message as a response message to the bearer setup command message to the macro eNB 1920 at operation 1919.

After receiving the bearer setup notify message from the new small cell eNB 1940, the macro eNB 1920 transmits a bearer release command message to the small cell eNB 1930 at operation 1921. The bearer release command message may include the UE ID, and the X2 m-eNB TEID (or S1 m-eNB TEID). After receiving the bearer release command message from the macro eNB 1920, the old small cell eNB 1930 transmits a bearer release confirm message as a response message to the bearer release command message to the macro eNB 1920 at operation 1923. The bearer release confirm message includes data information for the UE 1910 to which the old small cell eNB 1930 provides the service until a related timing point.

The macro eNB 1920 transmits a bearer status update message to the new small cell eNB 1940 at operation 1925. The bearer status update message may include the last data status which is received from the old small cell eNB 1930, i.e., data service information. The macro eNB 1920 transmits a RRC connection reconfiguration message to the UE 1910 at operation 1927. The RRC connection reconfiguration message may include switching indication information indicating that the UE 1910 should switch to the new small cell eNB 1940, an eNB ID of the new small cell eNB 1940, information on a RACH resource which is allocated for transmitting a switch indicator indicating that the UE 1910 has switched to the new small cell eNB 1940, and the like.

After receiving the RRC connection reconfiguration message from the old small cell eNB 1930, the UE 1910 transmits a RACH signal to the new small cell eNB 1940 at operation 1929. After receiving the RACH signal from the UE 1910, the new small cell eNB 1940 transmits a RACH response signal as a response message to the RACH signal to the UE 1910 at operation 1931. After receiving the RACH response signal, the UE 1910 switches from the old small cell eNB 1930 to the new small cell eNB 1940 and sets up a data path with the new small cell eNB 1940.

After transmitting the RACH response signal to the UE 1910, the new small cell eNB 1940 sets up the data path with the UE 1910 and transmits a bearer setup complete message to the macro eNB 1920 at operation 1933. The bearer setup complete message may include a UE ID of the UE 1910 and an X2 m-eNB TEID (or S1 m-eNB TEID).

Although FIG. 19 illustrates another example of a process of supporting a switching operation between a macro eNB and a small cell eNB in a mobile communication system according to an embodiment of the present disclosure, various changes could be made to FIG. 19. For example, although shown as a series of operations, various operations in FIG. 19 could overlap, occur in parallel, occur in a different order, or occur multiple times.

An operating process among a UE, a macro eNB, and a small cell eNB for reporting a measurement process performance result according to event occurrence in a mobile communication system according to an embodiment of the present disclosure is described below with reference to FIGS. 20A and 20B.

First, an example of an operating process among a UE, a macro eNB, and a small cell eNB for reporting a measurement process performance result according to event occurrence in a mobile communication system according to an embodiment of the present disclosure will be described with reference to FIG. 20A.

Figure 20A:
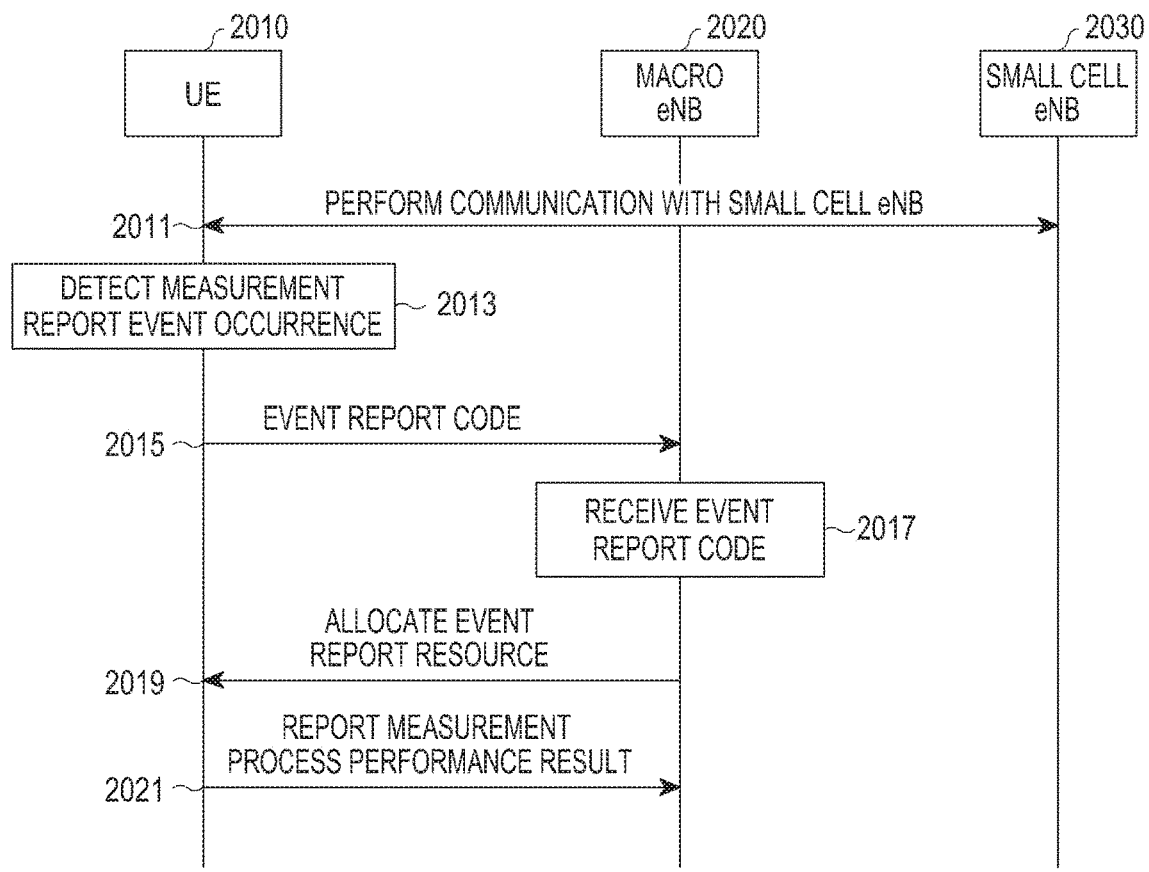
FIG. 20A schematically illustrates an example of an operating process among a UE, a macro eNB, and a small cell eNB for reporting a measurement process performance result according to event occurrence in a mobile communication system according to an embodiment of the present disclosure.

FIG. 20A schematically illustrates an example of an operating process among a UE, a macro eNB, and a small cell eNB for reporting a measurement process performance result according to event occurrence in a mobile communication system according to an embodiment of the present disclosure.

Referring to FIG. 20A, the mobile communication system includes a UE 2010, a macro eNB 2020, and a small cell eNB 2030.

The UE 2010 switches to the small cell eNB 2030 to receive a service at operation 2011. The UE 2010 detects that a measurement report event according to an event occurrence which is not periodically performed occurs at operation 2013, and transmits an event report code for requesting a resource which is used for transmitting a measurement process performance result according to the measurement report event occurrence to the macro eNB 2020 if a current timing point is not a timing point at which the UE 2010 switches to the macro eNB 2020 at operation 2015. After receiving the event report code from the UE 2010 at operation 2017, the macro eNB 2020 allocates a resource which the UE 2010 uses for transmitting the measurement process performance result according to the measurement report event occurrence, i.e., an event measurement report resource, to the UE 2010 at operation 2019. After being allocated the event measurement report resource from the macro eNB 2020, the UE 2010 reports the measurement process performance result to the macro eNB 2020 using the event measurement report resource at operation 2021.

Although not shown in FIG. 20A, it will be understood by those of ordinary skill in the art that the UE 2010 may additionally request an uplink resource to the macro eNB 2020 to report an additional measurement process performance result.

Although FIG. 20A illustrates an example of an operating process among a UE, a macro eNB, and a small cell eNB for reporting a measurement process performance result according to event occurrence in a mobile communication system according to an embodiment of the present disclosure, various changes could be made to FIG. 20A. For example, although shown as a series of operations, various operations in FIG. 20A could overlap, occur in parallel, occur in a different order, or occur multiple times.

Another example of an operating process among a UE, a macro eNB, and a small cell eNB for reporting a measurement process performance result according to event occurrence in a mobile communication system according to an embodiment of the present disclosure will be described with reference to FIG. 20B.

Figure 20B:
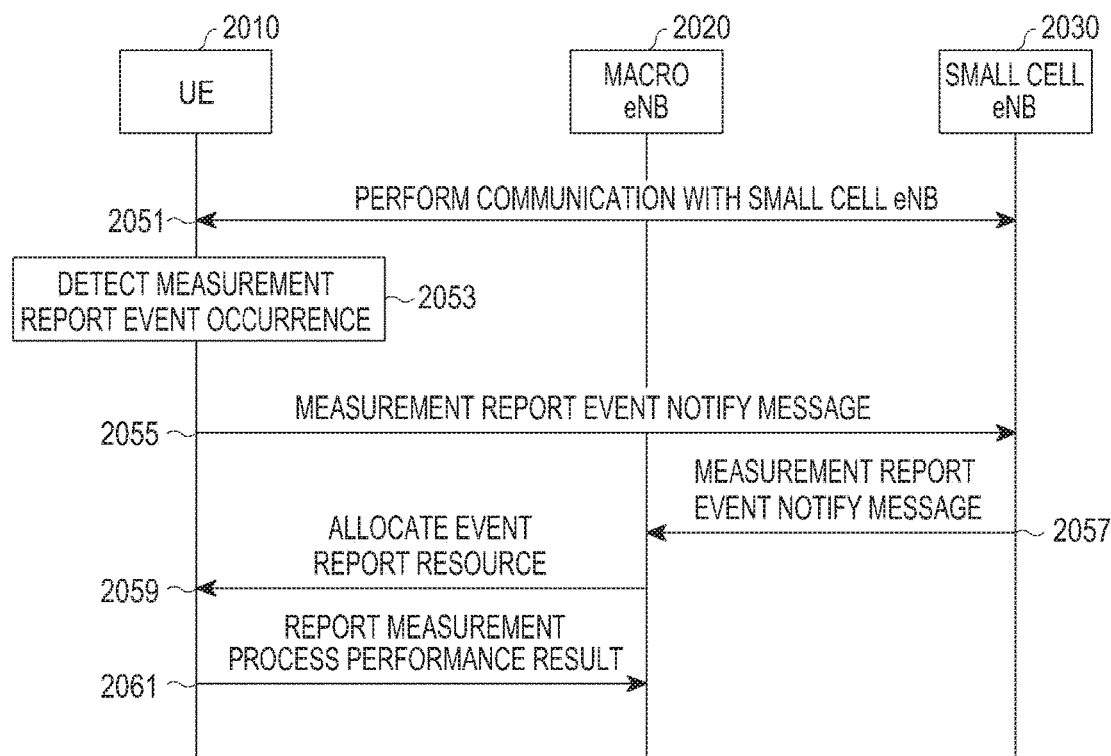
FIG. 20B schematically illustrates an example of an operating process among a UE, a macro eNB, and a small cell eNB for reporting a measurement process performance result according to event occurrence in a mobile communication system according to an embodiment of the present disclosure.

FIG. 20B schematically illustrates another example of an operating process among a UE, a macro eNB, and a small cell eNB for reporting a measurement process performance result according to event occurrence in a mobile communication system according to an embodiment of the present disclosure.

Referring to FIG. 20B, the mobile communication system includes a UE 2010, a macro eNB 2020, and a small cell eNB 2030.

The UE 2010 switches to the small cell eNB 2030 to receive a service at operation 2051. The UE 2010 detects that a measurement report event according to an event occurrence which is not periodically performed occurs at operation 2053, and transmits a measurement report event occurrence notify message indicating that a measurement report event occurs to the small cell eNB 2030 if a current timing point is not a timing point at which the UE 2010 switches to the macro eNB 2020 at operation 2055. After receiving the measurement report event occurrence notify message from the UE 2010, the small cell eNB 2030 transmits the measurement report event occurrence notify message indicating that the measurement report event occurs to the macro eNB 2020 at operation 2057.

After receiving the measurement report event occurrence notify message from the small cell eNB 2030, the macro eNB 2020 allocates a resource which the UE 2010 uses for transmitting a measurement process performance result according to the measurement report event occurrence, i.e., an event measurement report resource, to the UE 2010 at operation 2059. After being allocated the event measurement report resource from the macro eNB 2020, the UE 2010 reports the measurement process performance result to the macro eNB 2020 using the event measurement report resource at operation 2061.

Although not shown in FIG. 20B, it will be understood by those of ordinary skill in the art that the UE 2010 may additionally request an uplink resource to the macro eNB 2020 to report an additional measurement process performance result.

Although FIG. 20B illustrates another example of an operating process among a UE, a macro eNB, and a small cell eNB for reporting a measurement process performance result according to event occurrence in a mobile communication system according to an embodiment of the present disclosure, various changes could be made to FIG. 20B. For example, although shown as a series of operations, various operations in FIG. 20B could overlap, occur in parallel, occur in a different order, or occur multiple times.

An inner structure of a macro eNB in a mobile communication system according to an embodiment of the present disclosure is described below with reference to FIG. 21.

Figure 21:
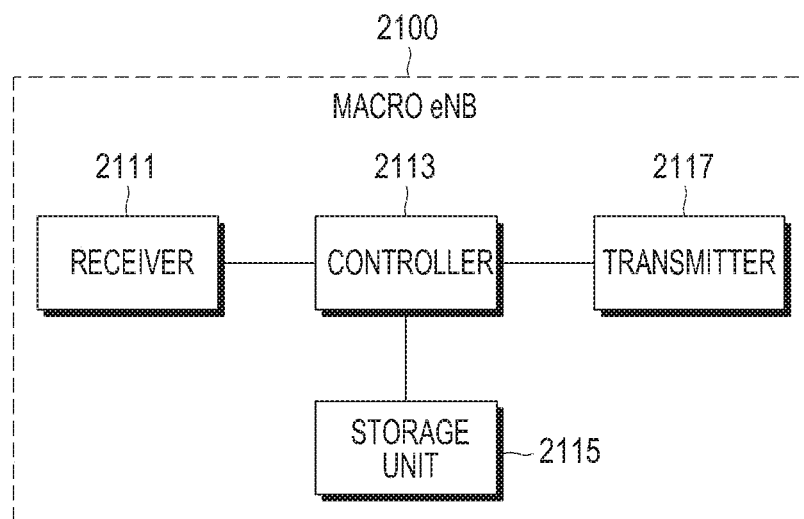
FIG. 21 schematically illustrates an inner structure of a macro eNB in a mobile communication system according to an embodiment of the present disclosure.

FIG. 21 schematically illustrates an inner structure of a macro eNB in a mobile communication system according to an embodiment of the present disclosure.

Referring to FIG. 21, a macro eNB 2100 includes a receiver 2111, a controller 2113, a storage unit 2115, and a transmitter 2117.

The controller 2113 controls the overall operation of the macro eNB 2100. The controller 2113 controls the macro eNB 2100 to perform an operation related to an operation of supporting a switching operation between the macro eNB 2100 and a small cell eNB in a UE. The operation related to the operation of supporting the switching operation between the macro eNB 2100 and the small cell eNB in the UE is performed in the manner described with reference to FIGS. 2A to 20B and a description thereof will be omitted herein.

The receiver 2111 receives various messages and the like from small cell eNBs, UEs, an S-GW, and the like under a control of the controller 2113. The various messages received in the receiver 2111 have been described in FIGS. 2A to 20B and a description thereof will be omitted herein.

The storage unit 2115 stores the messages received in the receiver 2111, various programs necessary for the operation of the macro eNB 2100, various data which occurs on the operation of the macro eNB 2100, and the like.

The transmitter 2117 transmits various messages and the like to the small cell eNBs, the UEs, the S-GW, and the like under a control of the controller 2113. The various messages transmitted in the transmitter 2117 have been described in FIGS. 2A to 20B and a description thereof will be omitted herein.

While the receiver 2111, the controller 2113, the storage unit 2115, and the transmitter 2117 are described as separate units, it is to be understood that this is merely for convenience of description. In other words, two or more of the receiver 2111, the controller 2113, the storage unit 2115, and the transmitter 2117 may be incorporated into a single unit.

An inner structure of a small cell eNB in a mobile communication system according to an embodiment of the present disclosure will be described with reference to FIG. 22.

Figure 22:
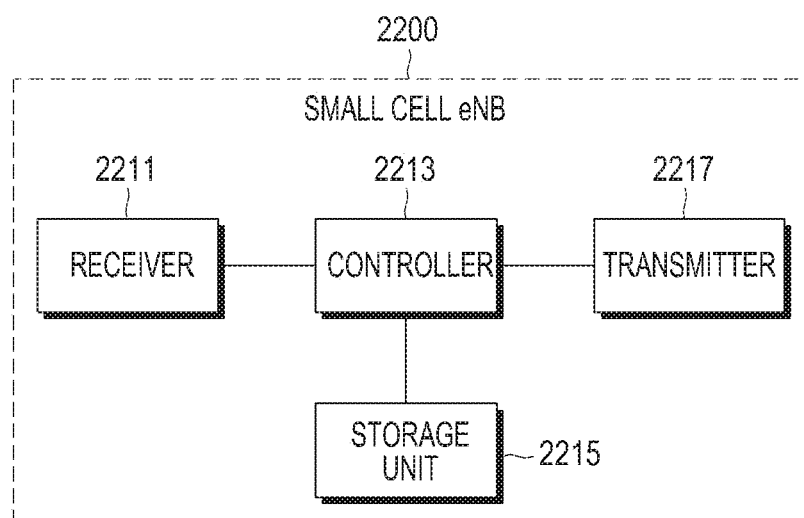
FIG. 22 schematically illustrates an inner structure of a small cell eNB in a mobile communication system according to an embodiment of the present disclosure.

FIG. 22 schematically illustrates an inner structure of a small cell eNB in a mobile communication system according to an embodiment of the present disclosure.

Referring to FIG. 22, a small cell eNB 2200 includes a receiver 2211, a controller 2213, a storage unit 2215, and a transmitter 2217.

The controller 2213 controls the overall operation of the small cell eNB 2200. The controller 2213 controls the small cell eNB 2200 to perform an operation related to an operation of supporting a switching operation between a macro eNB and the small cell eNB 2200 in a UE. The operation related to the operation of supporting the switching operation between the macro eNB and the small cell eNB 2200 in the UE is performed in the manner described with reference to FIGS. 2A to 20B and a description thereof will be omitted herein.

The receiver 2211 receives various messages and the like from a macro eNB, other small cell eNBs, UEs, an S-GW, and the like under a control of the controller 2213. The various messages received in the receiver 2211 have been described in FIGS. 2A to 20B and a description thereof will be omitted herein.

The storage unit 2215 stores the messages received in the receiver 2211, various programs necessary for the operation of the small cell eNB 2200, various data which occurs on the operation of the small cell eNB 2200, and the like.

The transmitter 2217 transmits various messages and the like to the macro eNB, the other small cell eNBs, the UEs, the S-GW, and the like under a control of the controller 2213. The various messages transmitted in the transmitter 2217 have been described in FIGS. 2A to 20B and a description thereof will be omitted herein.

While the receiver 2211, the controller 2213, the storage unit 2215, and the transmitter 2217 are described as separate units, it is to be understood that this is merely for convenience of description. In other words, two or more of the receiver 2211, the controller 2213, the storage unit 2215, and the transmitter 2217 may be incorporated into a single unit.

An inner structure of a UE in a mobile communication system according to an embodiment of the present disclosure will be described with reference to FIG. 23.

Figure 23:
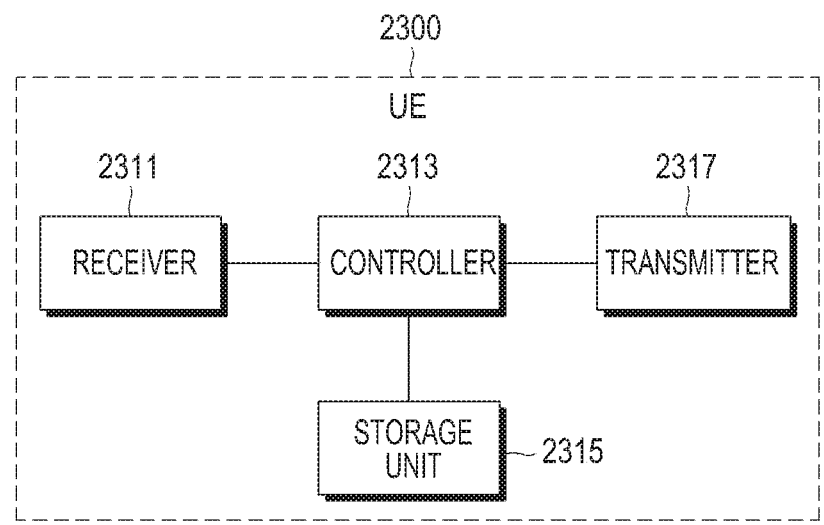
FIG. 23 schematically illustrates an inner structure of a UE in a mobile communication system according to an embodiment of the present disclosure.

FIG. 23 schematically illustrates an inner structure of a UE in a mobile communication system according to an embodiment of the present disclosure.

Referring to FIG. 23, a UE 2300 includes a receiver 2311, a controller 2313, a storage unit 2315, and a transmitter 2317.

The controller 2313 controls the overall operation of the UE 2300. The controller 2313 controls the UE 2300 to perform an operation related to an operation of supporting a switching operation between a macro eNB and a small cell eNB. The operation related to the operation of supporting the switching operation between the macro eNB and the small cell eNB is performed in the manner described with reference to FIGS. 2A to 20B and a description thereof will be omitted herein.

The receiver 2311 receives various messages and the like from a macro eNB, small cell eNBs, an S-GW, and the like under a control of the controller 2313. The various messages received in the receiver 2311 have been described in FIGS. 2A to 20B and a description thereof will be omitted herein.

The storage unit 2315 stores the messages received in the receiver 2311, various programs necessary for the operation of the UE 2300, various data which occurs on the operation of the UE 2300, and the like.

The transmitter 2317 transmits various messages and the like to the macro eNB, the small cell eNBs, the S-GW, and the like under a control of the controller 2313. The various messages transmitted in the transmitter 2317 have been described in FIGS. 2A to 20B and a description thereof will be omitted herein.

While the receiver 2311, the controller 2313, the storage unit 2315, and the transmitter 2317 are described as separate units, it is to be understood that this is merely for convenience of description. In other words, two or more of the receiver 2311, the controller 2313, the storage unit 2315, and the transmitter 2317 may be incorporated into a single unit.

An inner structure of an S-GW in a mobile communication system according to an embodiment of the present disclosure will be described with reference to FIG. 24.

Figure 24:
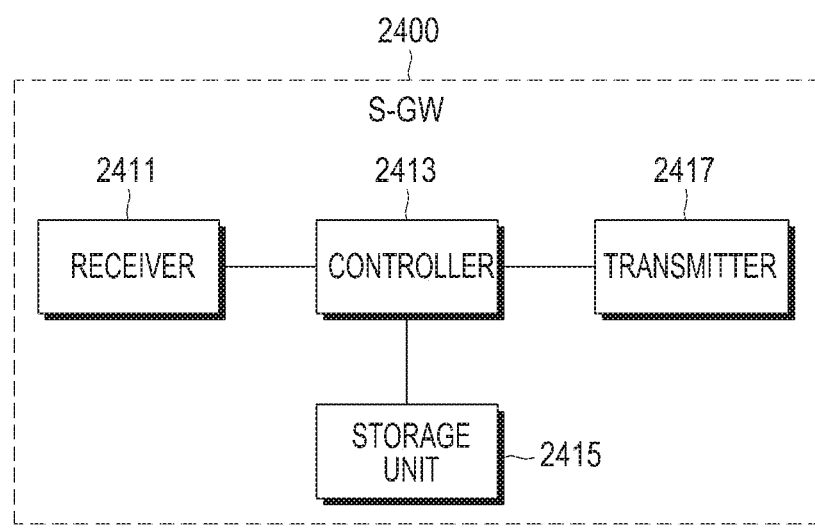
FIG. 24 schematically illustrates an inner structure of an S-GW in a mobile communication system according to an embodiment of the present disclosure.

FIG. 24 schematically illustrates an inner structure of an S-GW in a mobile communication system according to an embodiment of the present disclosure.

Referring to FIG. 24, an S-GW 2400 includes a receiver 2411, a controller 2413, a storage unit 2415, and a transmitter 2417.

The controller 2413 controls the overall operation of the S-GW 2400. The controller 2413 controls the S-GW 2400 to perform an operation related to an operation of supporting a switching operation between a macro eNB and a small cell eNB in a UE. The operation related to the operation of supporting the switching operation between the macro eNB and the small cell eNB in the UE is performed in the manner described with reference to FIGS. 2A to 20B and a description thereof will be omitted herein.

The receiver 2411 receives various messages and the like from a macro eNB, small cell eNBs, UEs, and the like under a control of the controller 2413. The various messages received in the receiver 2411 have been described in FIGS. 2A to 20B and a description thereof will be omitted herein.

The storage unit 2415 stores the messages received in the receiver 2411, various programs necessary for the operation of the S-GW 2400, various data which occurs on the operation of the S-GW 2400, and the like.

The transmitter 2417 transmits various messages and the like to the macro eNB, the small cell eNBs, the UEs, and the like under a control of the controller 2413. The various messages transmitted in the transmitter 2417 have been described in FIGS. 2A to 20B and a description thereof will be omitted herein.

While the receiver 2411, the controller 2413, the storage unit 2415, and the transmitter 2417 are described as separate units, it is to be understood that this is merely for convenience of description. In other words, two or more of the receiver 2411, the controller 2413, the storage unit 2415, and the transmitter 2417 may be incorporated into a single unit.

As described above, after being powered on, a UE receives information on a small cell eNB from a macro eNB while performing an initial attach procedure, and determines a small cell eNB to which the UE will switch. However, it will be understood by those of ordinary skill in the art that after completing the initial attach procedure, the UE may receive the information on the small cell eNB from the macro eNB while receiving a service from the macro eNB, and determine the small cell eNB to which the UE will switch. While communicating with the UE, the macro eNB provides information on small cell eNBs which the UE will search/measure, and determines a small cell eNB to which the UE will switch, and the UE receives switching indicator indicating a switch to the small cell eNB from the macro eNB, and performs a procedure of switching to the small cell eNB. In this case, a procedure in which the small cell eNB receives switching information for the UE and establishes a data path may be performed with the manner described above.

Certain aspects of the present disclosure may also be embodied as computer readable code on a non-transitory computer readable recording medium. A computer readable recording medium is any data storage device that can store data, which can be thereafter read by a computer system. Examples of the computer readable recording medium include read-only memory (ROM), random-access memory (RAM), compact disc (CD)-ROMs, magnetic tapes, floppy disks, and optical data storage devices. Also, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable, e.g., computer-readable, storage medium, e.g., a CD, a digital versatile disc (DVD), a magnetic disk, or a magnetic tape. A method and apparatus according to an embodiment of the present disclosure may be implemented by a computer or a mobile terminal that includes a controller and a memory, and the memory may be an example of a non-transitory machine-readable, e.g., computer-readable, storage medium suitable to store a program or programs including instructions for implementing various embodiments of the present disclosure.

The present disclosure may include a program including code for implementing the apparatus and method as defined by the appended claims, and a non-transitory machine-readable, e.g., computer-readable, storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a contents protect method which has been already installed, information necessary for the contents protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An operating method of a terminal in a mobile communication system, the operating method comprising:
   determining to transmit a measurement report to a first base station (BS) while receiving a service from a second BS for a second period from a second timing;
   transmitting, to the second BS, a message indicating that the terminal switches from the second BS to the first BS before a timing at which the terminal switches from the second BS to the first BS;
   switching from the second BS to the first BS; and
   transmitting the measurement report to the first BS.

2. The operating method of claim 1, further comprising:
   receiving the service from the first BS for a first period from a first timing.

3. The operating method of claim 2,
   wherein the receiving of the service from the first BS for the first period from the first timing comprises receiving the service from the first BS for the first period from the first timing based on a control frame and a data frame, or receiving the service from the first BS for the first period from the first timing based on the control frame,
   wherein a period applied to the control frame is identical to or different from a period applied to the data frame, and
   wherein the first timing is different from the second timing.

4. The operating method of claim 3,
   wherein the receiving of the service from the second BS for the second period from the second timing comprises receiving the service from the second BS for the second period from the second timing based on a control frame and a data frame, or receiving the service from the second BS for the second period from the second timing based on a data frame,
   wherein a period applied to the control frame is identical to or different from a period applied to the data frame, and
   wherein the first timing is different from the second timing.

5. An operating method of a first base station (BS) in a mobile communication system, the operating method comprising:
   providing a service to a terminal for a first period from a first timing; and
   receiving a measurement report from the terminal,
   wherein the measurement report is transmitted by the terminal that determines to transmit the measurement report to the first BS while receiving the service from a second BS for a second period from a second timing and switches from the second BS to the first BS.

6. The operating method of claim 5,
   wherein the providing of the service to the terminal for the first period from the first timing comprises providing the service to the terminal for the first period from the first timing based on a control frame and a data frame, or providing the service to the terminal for the first period from the first timing based on the control frame,
   wherein a period applied to the control frame is identical to or different from a period applied to the data frame, and
   wherein the first timing is different from the second timing.

7. The operating method of claim 5,
   wherein the second BS provides the service to the terminal for the second period from the second timing based on a control frame and a data frame, or provides the service to the terminal for the second period from the second timing based on a data frame,
   wherein a period applied to the control frame is identical to or different from a period applied to the data frame, and
   wherein the first timing is different from the second timing.

8. An operating method of a second base station (BS) in a mobile communication system, the operating method comprising:
   providing a service to a terminal for a second period from a second timing; and
   receiving, from the terminal, a message indicating that the terminal switches from the second BS to a first BS before a timing at which the terminal switches from the second BS to the first BS,
   wherein the message is transmitted by the terminal that determines to transmit a measurement report to the first BS while receiving the service from the second BS for the second period from the second timing.

9. The operating method of claim 8,
   wherein the first BS provides the service to the terminal for a first period from a first timing based on a control frame and a data frame, or provides the service to the terminal for the first period from the first timing based on the control frame, wherein a period applied to the control frame is identical to or different from a period applied to the data frame, and wherein the first timing is different from the second timing.

10. The operating method of claim 8, wherein the providing of the service to the terminal for the second period from the second timing comprises providing the service to the terminal for the second period from the second timing based on a control frame and a data frame, or providing the service to the terminal for the second period from the second timing based on a data frame, wherein a period applied to the control frame is identical to or different from a period applied to the data frame, and wherein the first timing is different from the second timing.

11. A terminal in a mobile communication system, the terminal comprising:

at least one processor configured to:
  determine to transmit a measurement report to a first base station (BS) while receiving a service from a second BS for a second period from a second timing,
  transmit, to the second BS, a message indicating that the terminal switches from the second BS to the first BS before a timing at which the terminal switches from the second BS to the first BS,
  switch from the second BS to the first BS, and
  transmit the measurement report to the first BS.

12. The terminal of claim 11, wherein the at least one processor is further configured to receive the service from the first BS for a first period from a first timing.

13. The terminal of claim 12, wherein the at least one processor is further configured to receive the service from the first BS for the first period from the first timing based on a control frame and a data frame, or receive the service from the first BS for the first period from the first timing based on the control frame, wherein a period applied to the control frame is identical to or different from a period applied to the data frame, and wherein the first timing is different from the second timing.

14. The terminal of claim 12, wherein the at least one processor is further configured to receive the service from the second BS for the second period from the second timing based on a control frame and a data frame, or receive the service from the second BS for the second period from the second timing based on a data frame, wherein a period applied to the control frame is identical to or different from a period applied to the data frame, and wherein the first timing is different from the second timing.

15. A first base station (BS) in a mobile communication system, the first BS comprising:

at least one processor configured to:
  provide a service to a terminal for a first period from a first timing, and
  receive a measurement report from the terminal, wherein the measurement report is transmitted by the terminal that determines to transmit the measurement report to the first BS while receiving the service from a second BS for a second period from a second timing and switches from the second BS to the first BS.

16. The first BS of claim 15, wherein the at least one processor is further configured to provide the service to the terminal for the first period from the first timing based on a control frame and a data frame, or provide the service to the terminal for the first period from the first timing based on the control frame, wherein a period applied to the control frame is identical to or different from a period applied to the data frame, and wherein the first timing is different from the second timing.

17. The first BS of claim 15, wherein the second BS provides the service to the terminal for the second period from the second timing based on a control frame and a data frame, or provides the service to the terminal for the second period from the second timing based on a data frame, wherein a period applied to the control frame is identical to or different from a period applied to the data frame, and wherein the first timing is different from the second timing.

18. A second base station (BS) in a mobile communication system, the second BS comprising:

at least one processor configured to:
  provide a service to a terminal for a second period from a second timing, and
  receive, from the terminal, a message indicating that the terminal switches from the second BS to a first BS before a timing at which the terminal switches from the second BS to the first B S, wherein the message is transmitted by the terminal that determines to transmit a measurement report to the first BS while receiving the service from the second BS for the second period from the second timing.

19. The second BS of claim 18, wherein the first BS provides the service to the terminal for the first period from the first timing based on a control frame and a data frame, or provides the service to the terminal for the first period from the first timing based on the control frame, wherein a period applied to the control frame is identical to or different from a period applied to the data frame, and wherein the first timing is different from the second timing.

20. The second BS of claim 18, wherein the at least one processor is further configured to provide the service to the terminal for the second period from the second timing based on a control frame and a data frame, or provide the service to the terminal for the second period from the second timing based on a data frame, wherein a period applied to the control frame is identical to or different from a period applied to the data frame, and wherein the first timing is different from the second timing.

* * * * *